(12) United States Patent
Monk et al.

(10) Patent No.: US 9,172,993 B2
(45) Date of Patent: *Oct. 27, 2015

(54) BROADBAND LOCAL AREA NETWORK

(71) Applicant: Entropic Communications, LLC, Carlsbad, CA (US)

(72) Inventors: Anton Monk, Del Mar, CA (US); Brett Bernath, San Diego, CA (US); Itzhak Gurantz, San Diego, CA (US); Ron Porat, La Jolla, CA (US); Yusuf Ozturk, San Diego, CA (US); Ronald B. Lee, San Diego, CA (US); Wee Peng Goh, Temecula, CA (US); Magnus Berggren, San Diego, CA (US)

(73) Assignee: Entropic Communications, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,101

(22) Filed: Jan. 13, 2014

(65) Prior Publication Data

US 2015/0082360 A1    Mar. 19, 2015

Related U.S. Application Data

(63) Continuation of application No. 11/231,349, filed on Sep. 19, 2005, now Pat. No. 8,631,450.

(60) Provisional application No. 60/633,091, filed on Dec. 2, 2004, provisional application No. 60/632,797, filed on Dec. 2, 2004, provisional application No. 60/633,002, filed on Dec. 2, 2004, provisional application No. 60/632,856, filed on Dec. 2, 2004.

(51) Int. Cl.
| | | |
|---|---|---|
| H04N 21/238 | (2011.01) | |
| H04N 21/24 | (2011.01) | |
| H04N 21/262 | (2011.01) | |
| H04N 21/442 | (2011.01) | |
| H04N 21/25 | (2011.01) | |
| H04N 21/436 | (2011.01) | |
| H04L 12/28 | (2006.01) | |
| H04N 21/61 | (2011.01) | |
| H04N 21/647 | (2011.01) | |

(52) U.S. Cl.
CPC ...... *H04N 21/43615* (2013.01); *H04L 12/2801* (2013.01); *H04L 12/2838* (2013.01); *H04L 12/2898* (2013.01); *H04N 21/6118* (2013.01); *H04N 21/6143* (2013.01); *H04N 21/64784* (2013.01)

(58) Field of Classification Search
None
See application file for complete search history.

(56) References Cited

U.S. PATENT DOCUMENTS

| | | | | |
|---|---|---|---|---|
| 6,052,380 | A * | 4/2000 | Bell | 370/445 |
| 6,137,793 | A * | 10/2000 | Gorman et al. | 370/360 |
| 6,481,013 | B1 * | 11/2002 | Dinwiddie et al. | 725/80 |
| 2002/0149706 | A1 * | 10/2002 | Rosen | 348/794 |
| 2002/0166124 | A1 * | 11/2002 | Gurantz et al. | 725/78 |
| 2003/0067903 | A1 * | 4/2003 | Jorgensen | 370/338 |
| 2003/0091067 | A1 * | 5/2003 | Emerson et al. | 370/473 |
| 2005/0120149 | A1 * | 6/2005 | Skarpness | 710/29 |
| 2006/0221819 | A1 * | 10/2006 | Padwekar | 370/229 |
| 2009/0217325 | A1 * | 8/2009 | Kliger et al. | 725/78 |

* cited by examiner

*Primary Examiner* — Brian T Pendleton
*Assistant Examiner* — Jean D Saint Cyr
(74) *Attorney, Agent, or Firm* — McAndrews, Held & Malloy

(57) ABSTRACT

A BCN network with BCN modems that enable network wired devices to communicate over a typical home coaxial network that may include passive splitters and different types of coaxial cable.

31 Claims, 18 Drawing Sheets

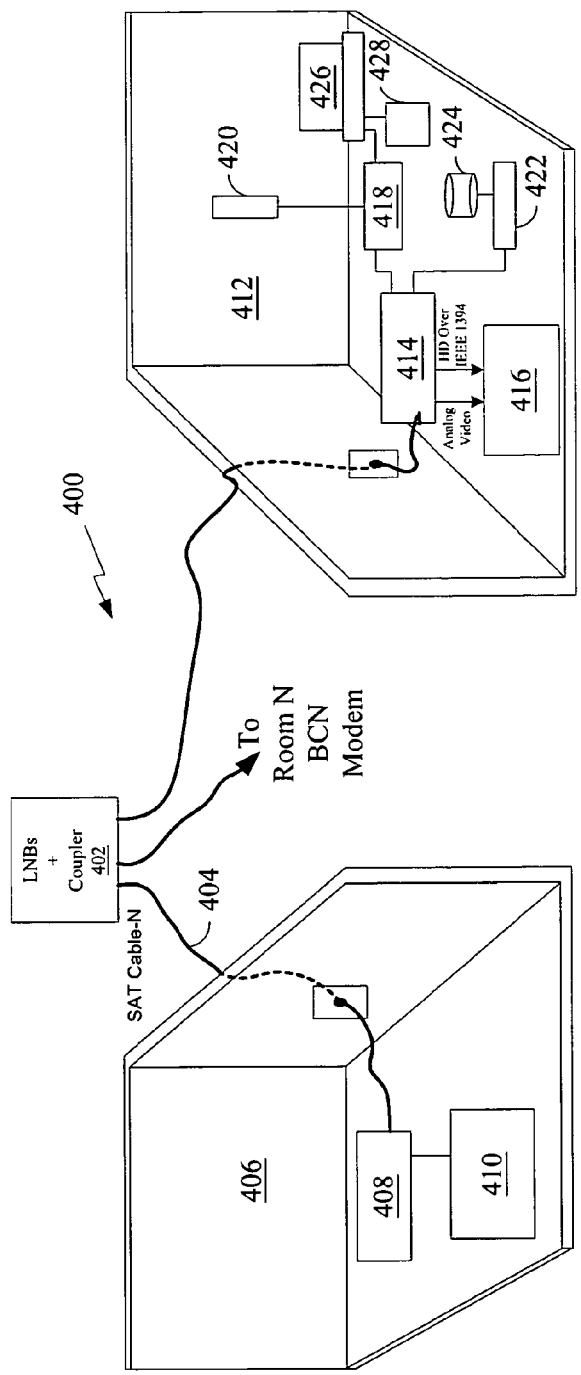
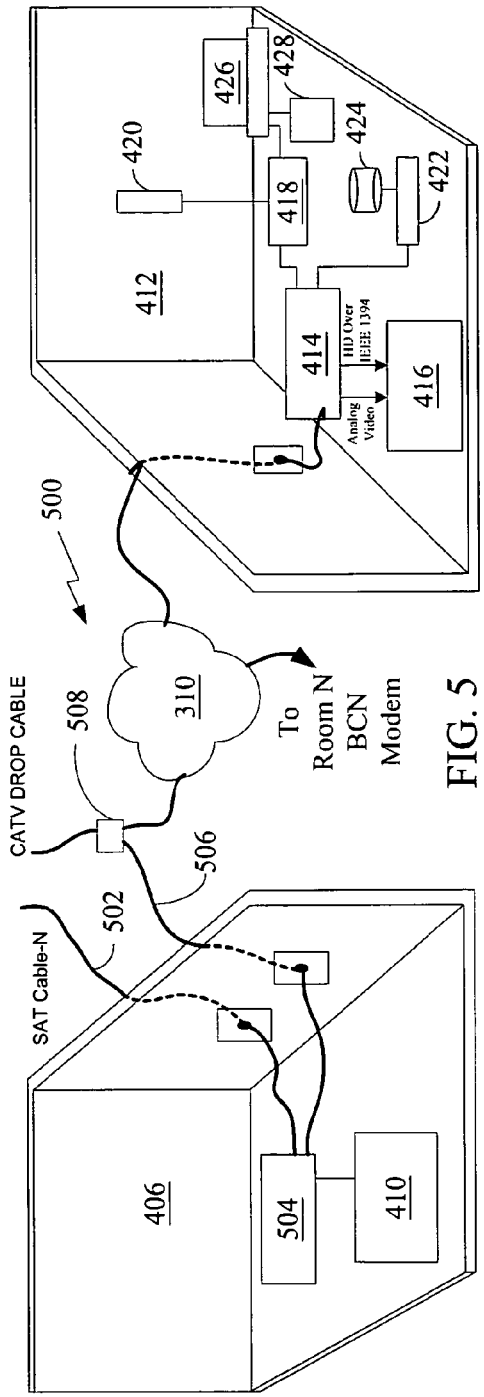
FIG. 4
FIG. 5

BROADBAND LOCAL AREA NETWORK

REFERENCE TO EARLIER-FILED APPLICATIONS

This application claims priority to U.S. Utility application Ser. No. 11/231,349 filed on Sep. 19, 2005, which claims priority under Section 119(e) to: U.S. Provisional Application Ser. No. 60/633,091 titled "Physical Layer Transmitter for Use in a Broadband Local Area Network," filed Dec. 2, 2004, U.S. Provisional Application Ser. No. 60/632,797 titled "A Broadband Local Area Network," filed Dec. 2, 2004, U.S. Provisional Application Ser. No. 60/633,002 titled "Multiple Access Controller for a Broadband Coaxial Network," filed Dec. 2, 2004, and U.S. Provisional Application Ser. No. 60/632,856 titled "Interface for a Broadband Coaxial Network," filed Dec. 2, 2004, all of which are incorporated herein, in their entirety, by this reference.

BACKGROUND OF THE INVENTION

1. Field of Invention

The invention relates to broadband communication networks, and in particular to local area broadband communication networks.

2. Related Art

The worldwide utilization of external television ("TV") antennas for receiving broadcast TV, cable television (CATV), and satellite TV is growing at a rapid pace. These TV signals received via an external TV antenna, cable TV and satellite TV, such as a direct broadcast satellite ("DBS") system, are usually located on the exterior of a building (such as a home or an office) and enter the building at a point-of-entry ("POE"). Multiple TV receivers, audio video receivers, and/or video monitor devices may be located within the building and these multiple devices may be in signal communication with the POE via a broadband cable network that may include a plurality of cables and cable splitters. Generally, these cable splitters are passive devices and distribute downstream signals from the POE to various terminals (also known as "nodes") in the building. The nodes may be various types of customer premise equipment ("CPE") such as cable converter boxes, televisions, video monitors, cable modems, cable phones, audio video receivers, set-top boxes (STBs) and video game consoles.

Within a typical building or home, there may be a mixture of coaxial cables of varying types and quality, such as RG-59, RG-6, RG-6 quad shield. Creating a less than optimal RF environment within the cable. Further, typical homes do little or no termination of cable outlets enabling the introduction of RF interference into the coaxial cables. Another problem often encountered with a typical home or building coaxial cable configuration is the use of multiple splitters of varying quality and frequency ranges. Thus, creating a problem for known approaches to local area networking over coaxial cable. Such networking often requires a more controlled RF environment or higher quality cabling to support higher frequency ranges.

Typically, a STB connects to a coaxial cable at a wall outlet terminal and receives cable TV and/or satellite TV signals. A device, such as the STB, connected to the coaxial cable may be called a node. Usually, the STB receives the cable TV and/or satellite TV signals and converts them into tuned RF TV signals that may be received by the TV receiver and/or video signals that may be received by a video monitor.

In FIG. 1, an example of a known broadband cable network 100 (also known as a "cable system" and/or "cable wiring") is shown within a building 102 (also known as customer premises) such as a typical home or office. The broadband cable system 100 may be in signal communication with an optional cable service provider 104, optional broadcast TV station 106, and/or optional DBS satellite 108, via signal path 110, signal path 112 and external antenna 114, and signal path 116 and DBS antenna 118, respectively. The broadband cable system 100 also may be in signal communication with optional CPEs 120, 122 and 124, via signal paths 126, 128 and 130, respectively.

In FIG. 2, another example of a known broadband cable system is shown within a building (not shown) such as a typical home. The cable system 200 may be in signal communication with a cable provider (not shown), satellite TV dish (not shown), and/or external antenna (not shown) via a signal path 202 such as a main coaxial cable from the building to a cable connection switch (not shown) outside of the building. The cable system 200 may include a multi-tap device (not shown) that allows communication to neighboring homes, a POE to the home 204, N:1 Splitter 206, which in this system may also be considered a Root Node, sub-splitter 208, and node devices 210, 212 and 214.

Within the cable system 200, the Multi-Tap (not shown) may be in signal communication with the Root Node/main splitter 206 via signal path 228. The Root Node/main splitter 206 may be the connection point from the cable provider that is located externally to the building of the cable system 200. The Root Node/main splitter 206 may be implemented as a coaxial cable splitter that may include passive devices and packages including connectors, transformer and/or filters.

The N:1 splitter 206 (a 2:1 splitter in FIG. 2) acts as the main splitter and may be in signal communication with N:1 sub-splitter 208 (a 2:1 splitter in FIG. 2), and node device 210, via signal paths 230 and 232, respectively. The N:1 sub-splitter 208 may be in signal communication with node devices 212 and 214 via signal paths 234 and 236, respectively. The node devices may be comprised of numerous known STB coaxial units such as cable television STBs and/or satellite television STBs, as well as various video and multimedia devices typically found in the home or office. Typically, the signal paths 228, 230, 232, 234, and 236 may be implemented utilizing coaxial cables 216, 218, 220, 222 and 224, respectively.

In an example operation, the cable system 200 would receive CATV, cable and/or satellite radio frequency ("RF") TV signals 226 from the Multi-Tap (not shown) via signal path 216 into the Root Node/main splitter 206. The Root Node/main splitter 206 may pass, transform and/or filter the received RF signals to a second RF signal 230 that may be passed to N:1 sub-splitter 208 via signal path 218. Sub-splitter 208 may then split the second RF signal 230 into split RF signals 234 and 236 and are passed to node devices 212 and 214 via signal paths 222 and 224, respectively. If the node device is a STB, the node device may convert the received split RF signal into a baseband signal (not shown) that may be passed to a video monitor (not shown) in signal communication with the STB. Similarly, the Root Node/Main Splitter passes a second signal 232 via signal path 220 to another node device 210.

In recent years, numerous consumer electronics appliances and software applications have been developed and continue to be developed that are able to receive, store, process and transmit programming information to multiple devices in the home at the time and manner as determined by the viewer. The main drawback to the ability of users to view multimedia information stored on multiple storage devices at the home and view it (or listen to it) on any capable home appliance at the time and manner of his choosing is the lack of a viable home networking solution. There are large numbers and types of CPEs that can be utilized and shared in such a fashion including televisions, video monitors, cable modems, cable phones, video game consoles, and audio components, as well as various storage devices. There is a growing need for different CPEs to communicate between themselves in a network type of environment within the building. As an example, users in a home may want to share other types of digital data (such as video and/or computer information) between different devices in different rooms of a building.

The present invention is focused on utilizing the home coaxial cable as a medium for high speed home networking by utilizing frequencies above the ones currently used by the Cable Operators for their cable service. The home coaxial cable is a natural medium for connecting multimedia devices since it has enormous amount of available bandwidth required for the high data rates which are needed for such applications and also, all the multimedia devices and appliances are most likely to be already connected to the coaxial cable. Unfortunately, most broadband cable networks (such as the examples shown in both FIG. 1 and FIG. 2) presently utilized within most existing buildings are not configured to allow for networking between CPEs. Most broadband cable networks utilize broadband cable splitters that are designed to split an incoming signal from the POE into numerous split signals that are passed downstream to the different nodes in different rooms, or equivalently, combine signals from multiple sources (on the "output" ports) to an aggregate on the "input" port. The existing conventional wisdom is that the use of splitters in the existing broadband cable networks make these networks able to communicate only between the "point of entry" 204 and node deN'Tt&s 210, 212, and 214, and prevents direct networking between node devices in the network because signals returning from the node devices cannot be routed back through the splitters, i.e., cannot "jump" a splitter. The present invention describes a system that allows node devices ("CPEs") to communicate directly over the existing coaxial cable with its current architecture without the need to modify the home cable infrastructure.

As an example, in a typical home the signal splitters are commonly coaxial cable splitters that have an input port and multiple output ports. Generally, the input port is known as a common port and the output ports are known as tap ports. These types of splitters are generally passive devices and may be constructed using lumped element circuits with discrete transformers, inductors, capacitors, and resistors and/or using strip-line or microstrip circuits.

Presently many CPEs utilized in modern cable and DBS systems, however, have the ability to transmit as well as receive. If a CPE is capable of transmitting an upstream signal, the transmitted upstream signal from that CPE typically flows through the signal splitters back to the POE and to the cable and/or DBS provider. In this reverse flow direction, the signal splitters function as signal combiners for upstream signals from the CPEs to the POE. Usually, most of the energy from the upstream signals is passed from the CPEs to the POE because the splitters typically have a high level of isolation between the different connected terminals resulting in significant isolation between the various CPEs.

The isolation creates a difficult environment in which to network between the different CPEs because the isolation results in difficulty for transmitting two-way communication data between the different CPEs. However, CPEs are becoming increasingly more capable and a growing number of users desire to network multiple CPEs to share storage and capabilities across the network.

Therefore, there is a need for a system and method to connect a variety of CPEs into a local data network, such as a local area network ("LAN"), within a building such as a home or office, while utilizing an existing coaxial cable network within the building. Additionally, there is a need for the system and method to have the capability of allowing the user to incorporate a variety of newly developed CPEs into the local data network quickly and easily.

SUMMARY

A Broadband Coaxial Network (BCN) network formed by a plurality of common coaxial network elements that may include passive splitters and coaxial network nodes where a signal is transmitted from a first BCN modem to one or more other BCN modems with the signal having multiple paths caused by reflected signals from the splitters and coaxial network elements. A Network Controller (NC) BCN modem is established by the activation of the first BCN modem or when there are multiple devices through a selection process. The other BCN modems in the network then communicate with the NC to be admitted to the network and when attempting to access the network and request transmission opportunities to any other node in the network. Each BCN modem communicates with the other BCN modems in the network and establishes the best modulation and other transmission parameters that is optimized and periodically adapted to the channel between each pair of BCN modems. Further, a bridge can be created between a first type of network and a second type of network, such as an Ethernet wiring to a coaxial network wiring.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 4 illustrates two examples of two different architectures for a satellite television system utilizing networking between devices, in this case, utilizing the Satellite cable to form a network between the devices.

FIG. 5 illustrates another satellite television bridging approach that employs the BCN network of FIG. 3.

DETAILED DESCRIPTION

In the following description of the exemplar embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
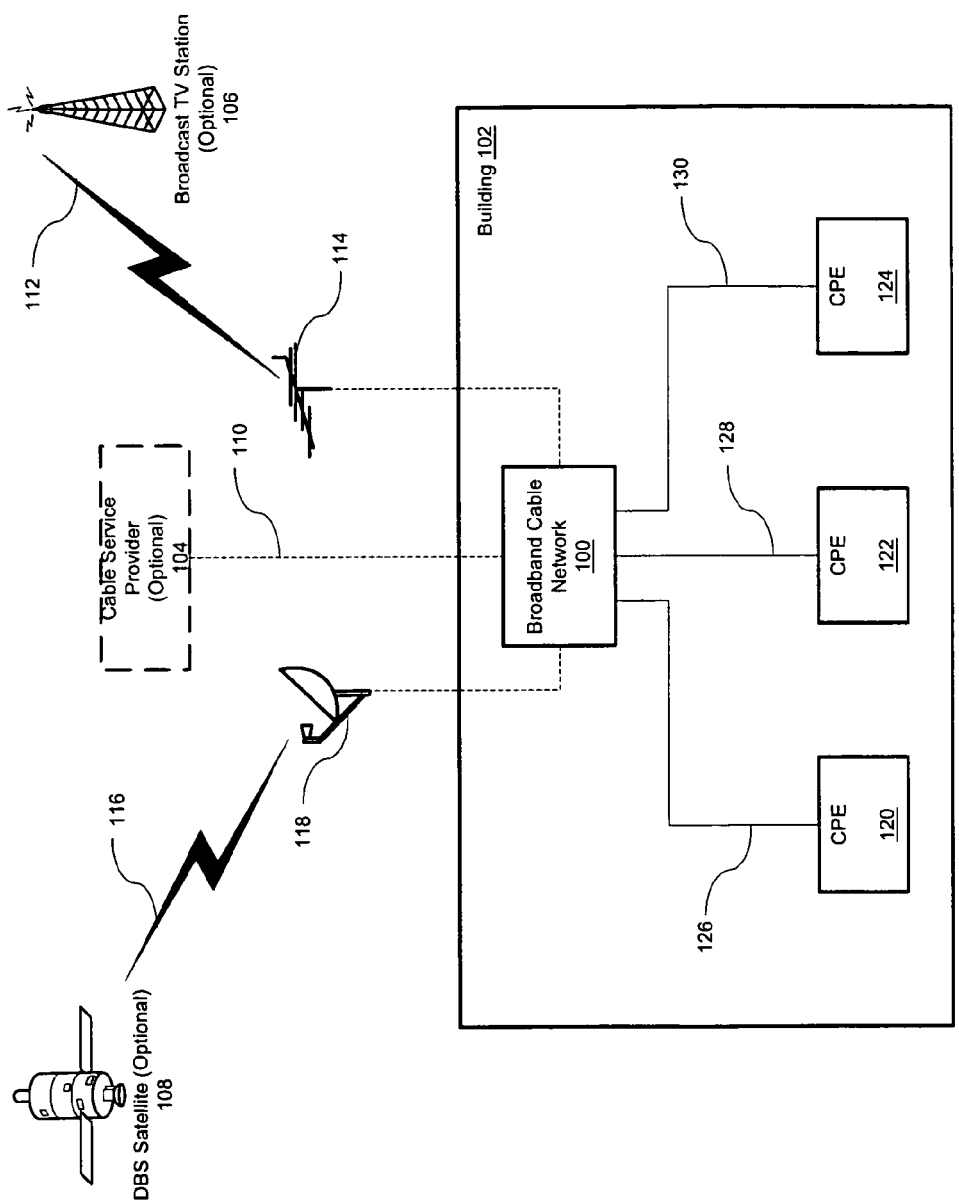
FIG. 1 shows a block diagram of an example implementation of a known broadband cable system within a building.
Figure 2:
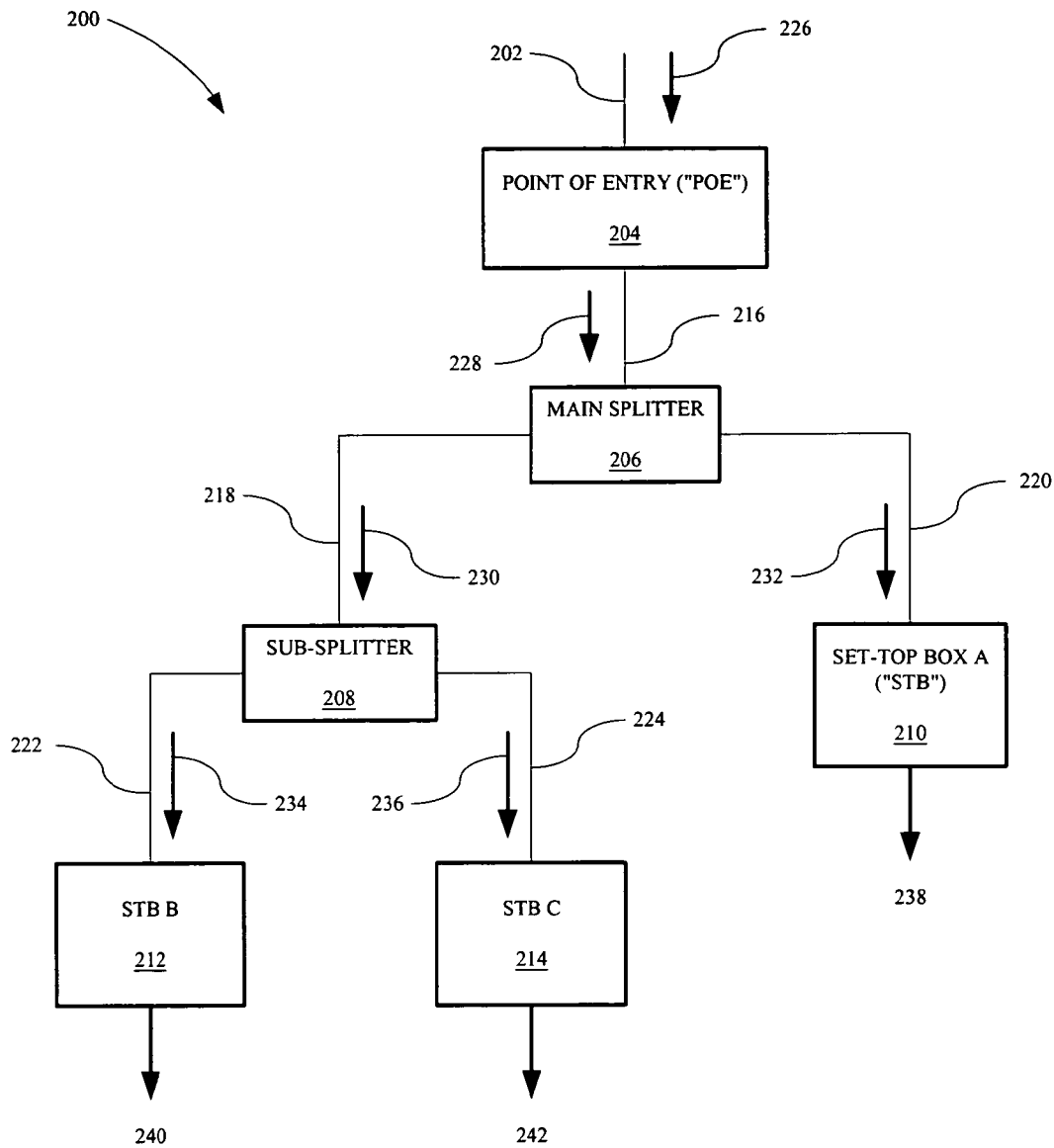
FIG. 2 shows a block diagram of another example implementation of a known broadband cable system within the building shown in FIG. 1.
Figure 3:
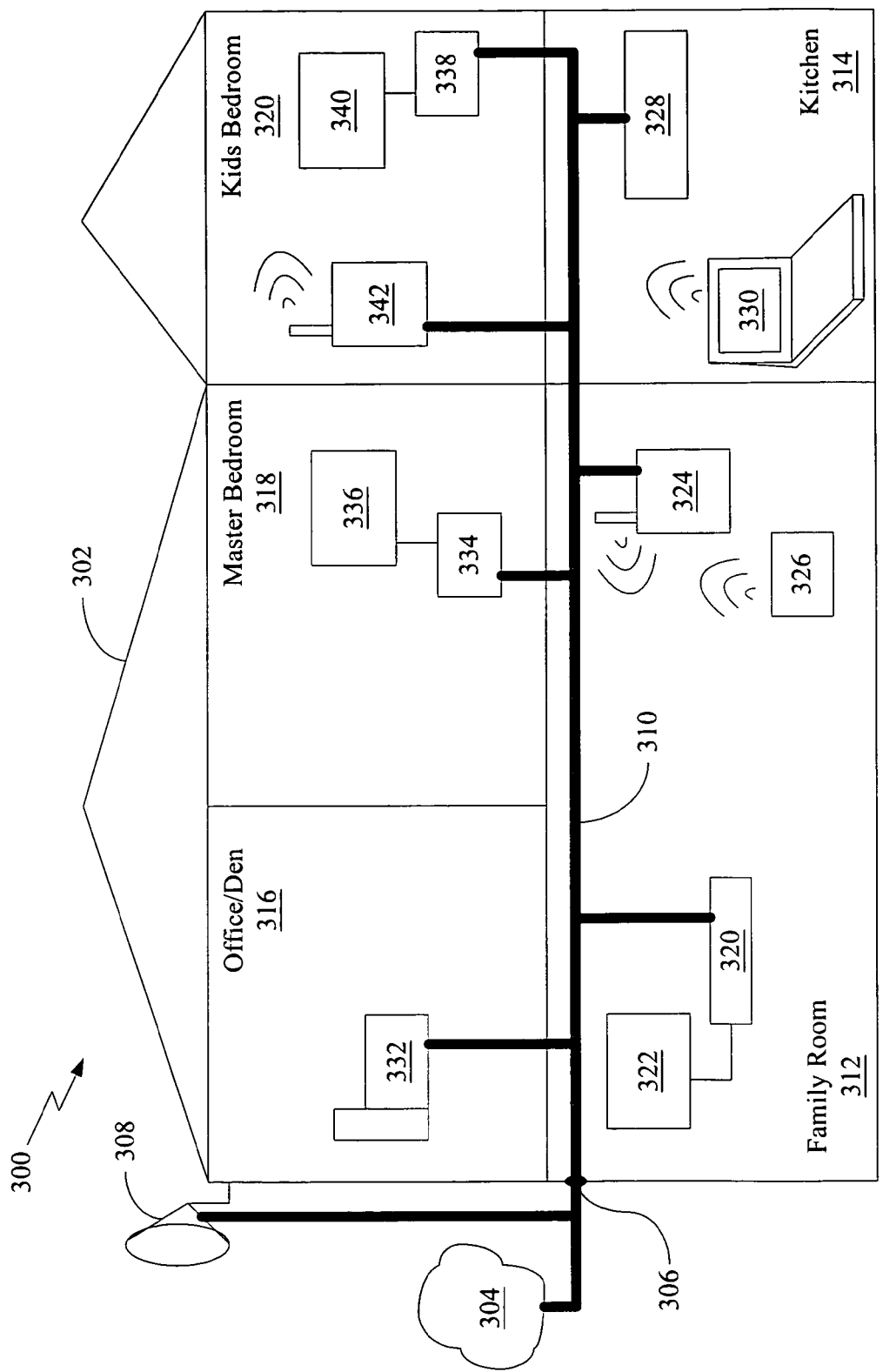
FIG. 3 shows an example of a BCN network within a home or building and its utilization.

Turning to FIG. 3, a diagram 300 of a BCN network within a home or building 302 is shown. A cable/terrestrial network connection 304 is made at a POE 306 in home 302. The home 302 has a satellite dish 308 that may also enter at the POE 306. The satellite dish 308 and cable/terrestrial network 304 may carry data, video, and audio signals that may be encoded as analog signals and/or digital signals.

A BCN network 310 within the home 302 connects with the satellite dish 308 and cable/terrestrial network 304 at POE 306. The BCN network 310 may have connections in different rooms of the home 302, for example, a family room 312, kitchen 314, office/den 316, master bedroom 318, and kids' bedroom 320. In the family room 312, there may be electrical/electronics devices such as a home media server 320 (also denoted as DVRs such as a personal computer, REPLAYTV or TIVO) that may be connected to a television (i.e., normal television or high definition) or video monitor 322. Another type of device in the family room 312 connected to the BCN network 310 may be a wireless access point (AP) 324 that communicates with wireless devices such as WebPad 326 using a communication standard such as IEEE 802.11(a, b, and/or g), or BlueTooth, to name but a few communication standards. In the kitchen 314, a network audio appliance 328, such as a WMA/MP3 Audio Client, may be connected to the BCN network 310. Further, a laptop personal computer 330 having wireless access ability may communicate with the wireless AP 324 located in the family room 312.

The upstairs of home 302 is shown with a media center personal computer 332 connected to the BCN network 310 in the office/den 316. The master bedroom 318 may have a STB 334 that may demodulate an analog or digital signal from a cable headend or a satellite receiver connected to television or video monitor 336. In the kids' bedroom 320, another STB 338 and television or video monitor 340 is shown along with another wireless access point 342 connected to the BCN network 310.

The different types of devices connected to the BCN network 310 are provided as examples of some of the different types of video, data, multimedia, and audio devices that may be typically coupled to the BCN network 310. The BCN network 310 enables two-way communication between network entities such as the media center personal computer 332 and laptop personal computer 330 via the wireless AP 324 or 342. The BCN network 310 may also provide streaming multimedia support to transport audio and video, for example, from the media center PC 332 to the Set-top boxes 334 and/or 338 or any other device connected on the BCN home network 310.

The BCN network 310 may also connect BCN modems that may be present in the different devices shown in FIG. 3 in a peer-to-peer mesh network, such that every BCN modem enabled device can communicate directly with any other BCN modem enabled device on the network. Also, in addition to the peer-to-peer communications, the system can also offer capabilities that may be point-to-multipoint optimized. The BCN modem may be a device that communicates across one or more of multiple RF channels where the communications over each RF channel by the various devices is divided by time, where each device transmits in a different time slot, typically referred to as a time division multiple access (TDMA) communication, and each device transmits or receive at a time denoted as time division duplex (TDD), thus enabling one node to transmit at a time into an assigned TDMA frequency channel.

Hence, in the preferred implementation, the BCN network is a multichannel TDMA/TDD system. Even though there is nothing prohibiting a simultaneous use of multiple frequencies on the same logical network, most of the description that follows assumes that the devices that form the network are operating on a single frequency channel. Network operation over multiple frequency channels can be accomplished in several ways. One method can perform transmission opportunities allocations based on both time and frequency. In this case, a given BCN node receives its transmission opportunities on a given frequency channel at a specific time slot. Similarly, it expects to receive designated packets from other stations on a given frequency channel at a given time slot. Another method for multiple frequency channels operations, is through the utilization of BCN modem bridges that can bridge single frequency channel networks (or multiple frequency channels networks). The extension of a single frequency channel operation to multiple frequency channels operation is relatively straight forward, so most of the present descriptions focus only on a single frequency channel operation.

Due to the unique transmission characteristics of the in-home coaxial network, which may include a highly dispersive environment with very large multipath reflections and a potentially different channel response between each pair of BCN modems in either direction, the lower network layer of the BCN network 310, denoted as the Physical Layer (or PHY layer) may be implemented with a modulation pre-coding (where the modulating waveform is modified to adapt to the channel in a format that is known to the demodulator in most cases) approach such as adaptive (or also denoted as bit-loaded) orthogonal frequency division multiplexing (OFDM). OFDM is a modulation technique that splits the modulated waveform into multiple RF sub-channels, each of which is modulated by a portion of the data stream and is sent over a different subcarrier frequency. With the precoded OFDM technique, the system will modulate each of the sub-carriers according to the signal-to-noise ratio of each of the subcarriers. Other precoding methods besides adaptive OFDM may be used in the BCN network 310 with single broadband carrier systems such as Tomlinson pre-coding or others.

In a typical application, each frequency channel of operation may constitute a separate network of communicating devices. It is also possible to include a network of multiple frequencies, but the operation of such a network requires rapid frequency changes by BCN modems on a packet-by-packet basis. In a single frequency of operation, one of the BCN modems is assigned as the Network Controller ("NC") and provides all the necessary information allowing other BCN modems to be admitted to the network, adapt to the network characteristics, synchronize to the network timing and framing, make transmission requests and be able to communicate with some or all of the other BCN modems in the network. In the current approach, the first BCN modem in the BCN network 310 becomes the NC and the other BCN modems may be referred to as slave BCN modems.

The NC provides network timing synchronization including the timing of admission area for slave BCN modems. When a BCN modem is activated, it attempts to locate the network timing by receiving a beacon identifying network timing and essential network control information including network admission area, and other information identifying the time location and characteristics of other important and valid information such as future beacon locations, future channel assignment information, etc. Any BCN modem that wishes to be admitted to the network, then transmits an admission request signal to the NC using the identified admission area. If collision occurs in the admission area between slave BCN modems, then an appropriate back-off algorithm may be used to resolve the collision and enable the colliding slave BCN modems to access the admission area at different times. Otherwise admission to the BCN network 310 may be achieved.

Once a new BCN modem establishes its identity and its communications with the NC, it may start a network admission process that may include several steps, including the optimization of its communications with the NC based on the channel response characteristics between the BCN modem and the NC in either communications direction, the optimization of the transmission characteristics between the BCN modem and any of the other BCN modems already in the network, any calibration requirements to ensure adequate communications, etc. Once admitted to the BCN network 310, the slave BCN modem can communicate efficiently with every other node in the network. The NC BCN modem assigns timeslots to the BCN modem to make requests for transmission opportunities to enable the communication between the slave BCN modem and each of the other nodes in the BCN network 310. Once the slave BCN modem contacts another node, the data path or link between the slave BCN modems and the other nodes may be optimized. By the end of the admission process, the slave BCN modem knows how to transmit efficiently to every other node in the BCN network 310 and subsets of nodes.

In order to manage the BCN network, control and optimize its operation and enable efficient data transmission in the network, several types of data packets may be used to transmit information. The three most prevalent packet types, for example, are, robust packets, probe packets and data transfer packets. The robust packet's main characteristics are that it can be received by any BCN modem in the network even before channels are optimized. The robust packets contain significant redundancy and are transmitted using lower order modulation. The robust packet type is used mainly to broadcast information to all nodes in the BCN network 310 and to enable communications between them before the network is optimized, or to communicate most important control and timing information. One of the robust packets may be called a beacon that may be sent at anytime, no matter the quality of the link, to provide the basic timing and control information that may be required for robust network operation. The robust packets may also transfer original contention and admission information. Another type of robust packet may be used for influencing hardware, i.e., a global reset of all BCN modems in the BCN network 310.

The probe packet type may be used for at least three functions in a BCN network 310. The first use for the probe packet is link optimization. An echo profile probe is sent to determine how far apart the BCN modems (i.e., nodes) are in the BCN network 310. The determined distance between nodes is used to calculate the cyclic prefix that is used in messages to accommodate for the echo and multipath profile of the specific link.

Another probe function may be for hardware calibration. The probe may be used for calibrating the I/Q amplitude and phase Quadrature balance of the up and down conversion process. The I/Q balance of the upconverter and/or downconverter may be off from the optimal 90 degrees and I/Q amplitude balance may require calibration. One can accommodate a less stringent I/Q hardware requirements by using probe packets for adaptive calibrations. The probe packet may also be used by requesting a timeslot to be allocated by a NC that may be used by a BCN modem to send packets to itself or other nodes in order to calibrate parameters and circuits, such as power level, filters, in addition to the I/Q transmission signal.

The third type of packet is the data transport packet. The data transport packet is used to transfer data between nodes in the BCN network 310. These packets are denoted as a MAC packet unit (MPU) and are generally adaptively optimized for each transmission link in order to achieve the optimal network throughput.

From a communications services point of view, the BCN network provides both best effort and reserved communications capabilities. It can also support asynchronous and isochronous communications services. In the best effort services, any packet received by a BCN modem for communications over the network requires the BCN modem to make a request to the NC and receive a time allocation grant to transmit the packet. The BCN modem can make requests for data transmission opportunities for more than one packet but the key characteristics of this operation mode is that transmission requests and grants are made based on a packet or multiple packet transmission requirements basis and is of a temporary nature; i.e., no long term data transmission allocations commitments are provided to a BCN modem.

In the reserved mode, certain long-term data transmission requests and grants are made. In this case, the requests and grants can take several forms. A common method may be implemented where a BCN modem node makes a request and is granted a specific allocation for a certain data rate; for example, a BCN modem node may request 10 Mbps channel for a definite or indefinite duration. In this case, the NC controller (or the network, if the allocation is done in a different manner) may allocate certain packet transmission opportunities for this node that will amount to the allocated data rate based on the requested data rate. This allocation may provide for significant time duration until the requested duration expires, no data being transmitted for a predetermined duration, higher priority traffic obtaining the required allocation, or any other network policy that may be implemented according to the nature of the allocations and priorities.

Another method for a reserved channel allocation may include a base allocation (that may be of any size) and additional allocations that may be based on a flow control method that allows the NC to monitor a transmit buffer at the transmitting node (or other traffic requirement indication) and provide variable transmit opportunities according to the transmit buffer load or other indicators. In this case, the fixed reserved allocation can support the effective "average" data rate, while the additional allocations are able to accommodate temporary data rate "peaks." That allows a more efficient utilization of the channel, compared to a case where the reserved allocation is required to accommodate the peak data rate of a given link. Also, even though such reserved bandwidth is allocated on a "long term" basis, it may be readjusted very quickly to accommodate potential changes in the traffic profile.

The NC BCN modem (or the network, in cases where the allocations are performed in a different manner) may also provide asynchronous and isochronous functionality. Its characteristics are similar to those of the best effort and reserved channel communications capability and at times, the terms are used interchangeably. However, with asynchronous and isochronous functionality, the focus is on the timeliness of the services. Asynchronous functionality is similar to the best effort capability discussed above, but the focus is on the indeterminate nature of the timing of delivery. Since this service is in response mostly to a packet delivery that is of random nature, the BCN network does not provide a tight timing control on the latency of packet delivery through the BCN network. Priorities may also be assigned to packets within the BCN network 310 to ensure a priority delivery to certain packets based on IEEE 802.1p priority tags. Packets of higher priority may have preference traversing the network as established by a NC policy. Yet another example of asynchronous functionality may be flow-controlled reservation of timeslots and/or bandwidth for BCN modems. Flow-controlled reservation may include every node being able to communicate the status of its transmission buffer status to the NC BCN modem. The NC BCN modem may give opportunities to transmit even if the other nodes have not requested opportunities for transmission. An isochronous service is similar to the reserved service but the focus is on a tight control on the delivery time and time variation through the network. Certain communications services, such as MPEG Transport Stream (MPEG-TS) may have tight jitter requirements. In order for the BCN network to support such services, its own communications services needs to be able to limit the delay and delay jitter through the BCN network. This can be done through the assignment of a tightly controlled reserved bandwidth allocation.

As discussed in the above sections, the BCN network may offer both asynchronous best effort communications services and isochronous, reserved data transport services. An adaptation layer between other communications services and the BCN network allows it to provide a wide range of communications services over the BCN network and may be implemented in the protocol above a MAC layer for transport. The adaptation layer provides the specific protocol interface to the outside network and adapts it to BCN network transport. It provides all the necessary functions to adapt the specific protocol to be transported over the BCN network. This adaptation may include the same protocol on both sides of the network or may include protocol conversion functionality where one node that may be adapted to one protocol is able to communicate with another node that may be adapted to another protocol. A simple example may include a device with an Ethernet interface to a BCN node communicating with a device with a USB interface to a BCN node. The adaptation layer may transport other protocols, such as Ethernet, MPEG Transport Streams, IEEE 1394, and universal serial bus (USB), data over the BCN network. For example, a native MPEG packet from a MPEG transport stream is 188 bytes long and is transmitted with a defined clocking system, so the packets arrive in a predicted fashion. The 188-byte MPEG2 TS packet or multiple MPEG2 TS packets are placed (or encapsulated) in a BCN packet for transmission between BCN modems. Because a MPEG2 TS packet is always 188 bytes, and its timing of arrival is very well predicted, the bandwidth required in the BCN network 310 may be reserved to match the predicted arrival time and thus, such a packet can be transported over the BCN network very efficiently. Additional data, such as timestamps, may be added to the encapsulated packets without an impact on that data in order to assure a proper timing transfer resulting in an extremely low jitter. Also, the MPEG2-TS adaptation layer can provide Program ID filtering to select just the desired programs for delivery over the BCN network.

Another possible adaptation layer is for Ethernet packets. In this case, the adaptation layer may utilize the BCN network asynchronous protocol to transport Ethernet packets over the BCN network. This adaptation layer may also include the utilization of IEEE 802.1p priorities to provide a preferential transport to higher priority packets.

A third adaptation layer may include IEEE 1394 transport through the BCN network. In this case, the adaptation layer may utilize both the isochronous, reserved allocations of the BCN network protocol to transport the 1394 isochronous packets and the asynchronous service to transport the asynchronous 1394 packets. Also, it can transport the whole 1394 transport through the isochronous, reserved allocations. In a similar fashion, a USB adaptation layer can transport USB packets through the network.

One of the key features of the BCN network is its ability to co-exist with other services over the existing coaxial cable. Such services may include both analog and digital Cable TV services, satellite services and/or terrestrial TV services. In order to minimize the potential for interference by the BCN transmission on the existing services, the BCN modems in the BCN network 310 may use power control in order to manage the interference generated by and to each of the BCN modems by other BCN modems and other devices on the network. Nodes or BCN modems that are close to each other may be subject to a lower attenuation and thus require less power to communicate at a given data rate than nodes that are further apart. The nodes have the ability to adjust transmit power as communication needs dictate in order to achieve the required throughput with potentially lower transmit power. Thus, the interference created by transmitting nodes is minimized in the BCN network 310 without much impact on the total network throughput.

Other power control strategies are also possible. If the network is subject to a significant ingress or other interference from devices in the BCN network, transmitting to an interfered-with node at maximum power may overcome the interference. In this case, the network may deem it is necessary to slightly increase the probability of interfering with other devices in the network in order to enable more effective communications with interfered-with nodes. Other nodes that may not suffer the interference may be communicated with only at the nominal or controlled power level.

The BCN network is dynamic and allows the occasional additions and removals of nodes without disruptions of network communications. Each node in the network contains a BCN modem. One of the BCN modems usually assumes the role of a Network Controller ("NC") (which may also be referred to as the Network Coordinator). The NC can be associated with a specific BCN modem (for example, it can be associated with a network gateway or a router) or is dynamically assigned according to certain network rules. In a typical application, the NC BCN modem is established when the first BCN modem is activated in the cable network. In the current implementation, if the NC BCN modem dies or becomes unavailable, a successor takes it place. The successor may be the second BCN modem activated in the cable network and may monitor a signal from the NC BCN modem. If the signal is not received for a predetermined amount of time, then the successor becomes an NC for the BCN network 310. If both the first and second BCN modems are unavailable, then either a third designated node (if one exists) may take over or a hunt for an NC occurs between the slave BCN modems based on a defined strategy or in a random fashion with the appropriate back-off strategy to resolve conflicts. In other implementations, the slave BCN modem to take over as an NC may be based on random numbers selection, back-off timers, or similar approaches that vary slave BCN modems determining that an NC is unavailable. This feature may be referred to as NC mobility.

The NC BCN modem is responsible for managing the BCN network 310. The NC BCN modem manages the other clients' BCN access to the BCN network 310 and coordinates assignment of time slots for all BCN modems within a BCN network 310. Additionally, the NC BCN provides synchronization and timing to the other BCN modems in the BCN network 310.

In another implementation, each new BCN modem wishing to join the network listens to the network on a selected frequency channel to see whether there is an NC node on the channel. If there is, the new BCN modem receives the Beacon messages from the NC BCN. The Beacon messages are very robust and can be received even in a very poor channel environment. The Beacon also has information about the admission time slot for the new node and other network control information. If the new BCN modem is authorized to join the network, the transmit admission request in the admission slot announces its presence to the NC. If more than one new BCN modem is trying to access the admission time slot, the request may be unsuccessful and a backup algorithm (a well-known technique) is used for resolution. Once admitted to the network, the new BCN modem continues through the admission process, under the direction of the NC, and communicates with each of the other BCN modems, characterizing each of the possible communication paths to the other BCN modems. Once the paths to the other BCN modems are characterized, then the BCN modem optimizes the communication on each link to maximize transmission/reception efficiency and quality. Further, each BCN modem (including the NC) may periodically probe all the links to the other BCN modems and continually makes adjustments to maintain the efficiency and quality. Thus, each path or channel between all BCN modems is individually characterized and optimized, both on admission and periodically thereafter. Also, if a severe communication interruption occurs, the affected node may repeat a process similar to the admission process.

The BCN network may also span across several channel frequencies, where a single NC may control several frequencies, or each frequency may have its own NC. In the first case, the NC may control the access to multiple channel frequencies by controlling not only the time slot allocations of BCN modems in the network but also their operating frequencies. An example of this network may include a NC that controls more than one frequency channel and may assign communications resources to all the BCN modems in the frequencies under its control. Such network may include the assignment of other BCN modems to a given frequency for certain duration or assign communications resources such as transmission slots and frequencies on a packet-by-packet basis. All other descriptions above are relevant to such an operation as well.

Turning to FIG. 4, a satellite television bridging approach that employs the BCN network of FIG. 3 is illustrated in cut-away diagram 400. A satellite LNB+coupler 402 (this may be two or more separate devices that are connected to each other by signal communication, but is shown here as a single entity for convenience) receives and down converts a satellite signal from the frequencies transmitted from the satellite to the antenna (not shown) to frequencies that can be carried over the coaxial cable 404. The signal is carried by a coaxial cable 404 to a room 406 having a STB 408 that tunes, demodulates and decodes the satellite signal into a signal for display on television 410. The STB 408 may be equipped to stream a digitally-encoded video show via a BCN modem located in the STB to another BCN modem in another room. The streamed video may be transmitted from the STB 408 to another room 412 via the LNB+coupler 402. The streamed video may be received at the slave BCN modem 414 that is attached to television 416. The slave BCN modem 414 communicates with other networking devices, such as a router 418, DSL/Cable Modem 420, and an A/V jukebox 422, using a communication standard such as TCP/IP over Ethernet or IEEE 1394 standard. The A/V jukebox 422 may have a network-attached storage (NAS) 424. The router 418 may be connected to a personal computer 426 that communicates via a USB connection with a printer 428.

The satellite signal is received at the LNB+coupler 402 and is then transmitted via the coaxial cable 404 to the STB 408. The STB 408 has 1+N tuners/receivers used to select desired channels. The channel received by the first tuner is demodulated, decoded and is shown on the connected TV (or monitor) 410. The other N tuners may each select a channel and demodulate and decode the signal received at the selected channel as a digital video data stream. The data stream is carried by the BCN network back through the LNB+coupler 402 to the device having the slave BCN modem located in another room 412 for display on television 406 or through the router 418 to be displayed on the personal computer 426. Such transmission of data between devices and rooms may occur to any number of rooms, provided another BCN modem is present on the BCN network in the other rooms. Transmission may be point-to-point or point-to-multipoint. The LNB+coupler 402 provides the means of communication between the various cables 404 connected to it at a certain frequency band or several frequency bands that do not interfere with other signals on these cables. Such frequencies may include both baseband frequencies and RF frequencies.

In FIG. 5, another satellite television bridging approach that employs the BCN network of FIG. 3 is illustrated in cut-away diagram 500. A cable 502 from a satellite antenna is coupled to a STB 504 having 1+N tuners/receivers. The STB 504 may have a second connection via a BCN modem to the BCN network 310 via cable 506 and cable television (CATV) drop 508. The BCN network 310 has outlets in other rooms, such as 412.

In this implementation, the satellite signal is received at the STB via cable 502. At least one of the 1+N tuners converts the signal into a video signal for display on a local television 410. The other N tuner/receivers tune and demodulate other possible channels where any, some or all demodulated data are then encoded into one or more digital streams and transmitted across the BCN network 310 by the BCN modem enabled device. The digital stream is then received in another room 412 at a device having another BCN modem. The digital stream is then converted and/or RF modulated for display on a television 416 or directly streamed to a personal computer 426. Even though digital streaming of video is used here to demonstrate data transmission across a BCN network, other types of data may be exchanged to transmit and/or receive.

Figure 6:
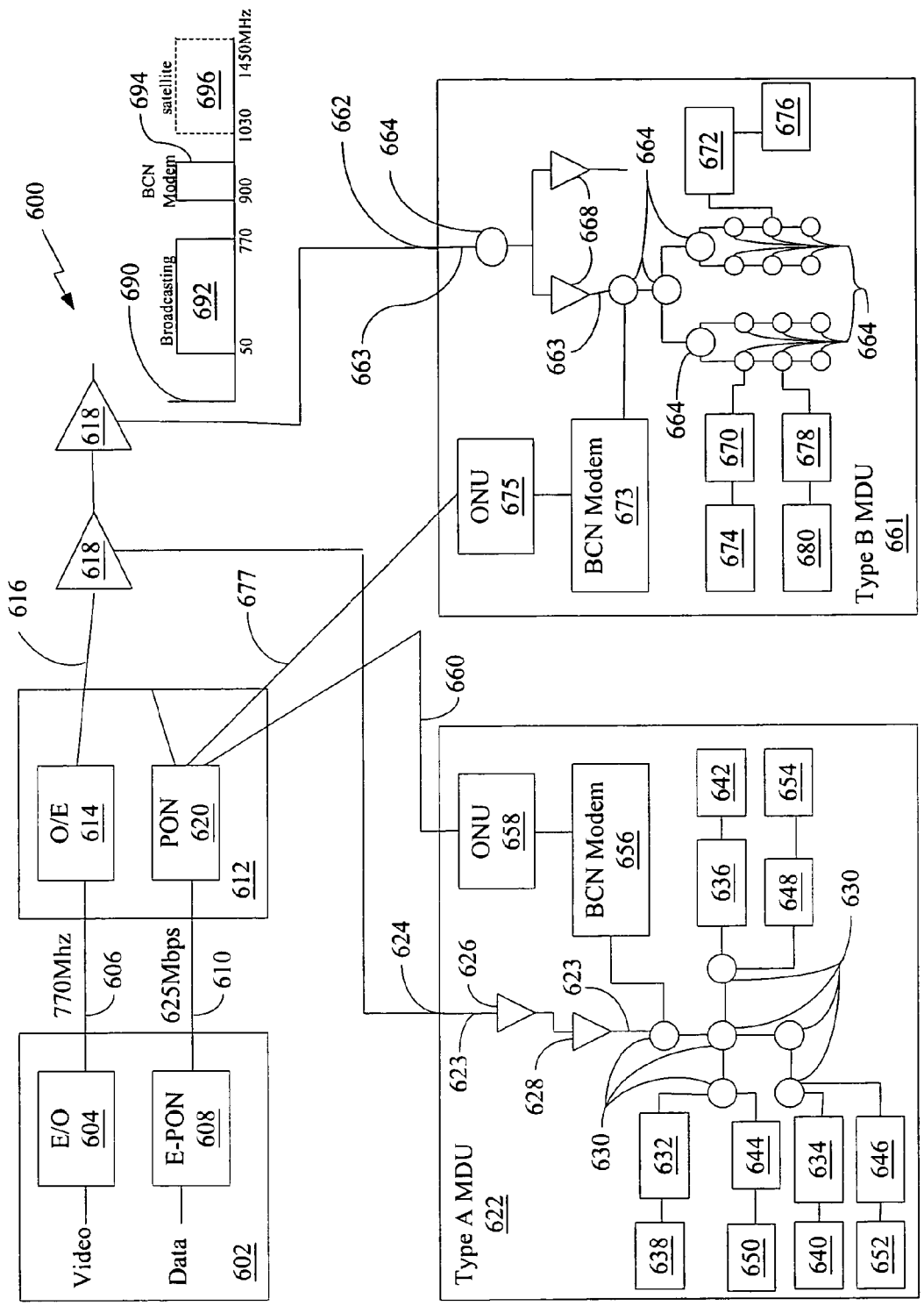
FIG. 6 is a block diagram of a multiple dwelling implementation that employs another configuration and utilization of a BCN network.

Turning to FIG. 6, a block diagram 600 of a multiple dwelling unit ("MDU") application that employs the BCN network is shown. It is often desirable to provide office buildings and apartment/condominium developments with cost effective data and video services. Such a system may be referred to as an "access type" implementation and is described with a cable television (CATV) headend 602 being a source for reception of video transmission from a provider of video services and connection to other two-way networks for data and video. The CATV headend 602 may have a fiber optical encoder 604 that encodes a single or multiple analog or digital video signals onto an optical physical transport medium, such as multimode fiber-optic cable 606. The headend 602 may also have an Ethernet to passive optical network ("E-PON") transceiver 608 that converts Ethernet data for transmission over a fiber-optic cable 610. The fiber-optic cables 606 and 610 may be terminated at a hybrid fiber-optic cable ("HFC") node 612.

The HFC node 612 may have an Optical to Electrical converter 614 to decode the received video signal for transmission over a coaxial cable 616. The coaxial cable 616 may have one or more amplifiers 618 to maintain the necessary transmitted signal strength range along the coaxial distribution. A passive optical network ("PON") splitter 620 may split the optical signal to multiple location terminations, e.g., 16 terminations.

At least two different access implementation examples in a MDU are shown where data may be supplied by fiber-optic cable to the MDU and distributed to the different units on the coaxial cable typically used for video services, such as cable television distribution. The first example, referred to as "Type A MDU" dwelling 622, has a POE 624 to the dwelling 622. The coaxial cable within the dwelling 622 forms the BCN network 623. Often within the dwelling 622, one or more amplifiers 626, 628 are installed along with one or more passive splitters 630 to form the BCN network 623. The BCN network 623 is connected to BCN modems 632, 634, and 636 that enable Ethernet traffic to be carried over the BCN network 623. The BCN modem 632 may be connected to a personal computer (PC) 638, as BCN modem 634 is connected to PC 640, and BCN modem 636 to PC 642. The BCN network may also carry analog or digital video signals to set-top boxes 644, 646, and 648 that may be connected to televisions 650, 652, and 654, respectively.

The BCN network 623 is connected to the Internet via a BCN modem enabled Ethernet hub 656 that is shown connected to an optical network unit (ONU) 658 that functions as a transceiver on the fiber-optic cable 660 connected to PON 620. Thus downstream video and audio signals are transmitted via the HFC node 612 to the dwelling 622. A two-way data path exists from the ONU 658 to the E-PON 608 located at the headend 602.

The "Type A" MDU implementation enables multiple units, e.g., 32 units in the example embodiment, to share the BCN modem enabled Ethernet hub 656 and ONU 658. The communication between devices, such as PCs 638 and 640 in the "Type A" implementation, flows through the PON 620 and headend 602. This is in contrast to the single home BCN network, shown in FIG. 3, where devices within the home communicate directly with each other.

In the other implementation example, "Type B" MDU 661 has a coaxial cable POE 662 connected to the internal coaxial network 663. The internal coaxial network 663 may have passive elements such as splitters 664. The coaxial network 663 may have BCN modems 670 and 672 connected to PCs 674 and 676, respectively, or other Ethernet enabled devices. The BCN modems 670 and 672 communicate with the BCN modem enabled hub 673 that is coupled to the ONU 675 for bi-directional communication with the PON 620 via a fiber optical cable 677. One or more STBs, such as 678, may be connected to televisions, such as 680, and the coaxial network 663. Unlike the "Type A" MDU 622 implementation, the "Type B" MDU 661 implementation has some units with access to the BCN Modem enabled hub 673 while others only receive the traditional features provided by a cable company.

Within either the "Type A" or Type B" MDU implementations, the coaxial cable may employ a frequency plan 690 that uses 50-770 MHz 692 for broadcasting of video and audio signals. Another area of the frequency plan 690 employs a 50 MHz bandwidth 694 at approximately 900 MHz for use by the BCN modems. The upper end of the frequency band 1030 MHz-1450 MHz 696 may be used by satellite television systems, such as DIRECTV.

The BCN modems are able to create a BCN network while supporting features such as high definition television, Dolby 5.1 digital audio, parental control systems, return channels (remote or interactive television), and Internet data. They enable CPE devices that are TCP/IP enabled, or utilize other protocols, to communicate across the BCN network by communicating with a BCN modem that receives the data via a communication protocol, such as TCP/IP, and converts the TCP/IP signal into a signal for transmission across the BCN network.

The BCN modems may also use encryption algorithms to encrypt data to be transmitted across the BCN network. The transmitted data is then decrypted at the receiving BCN modem for delivery to another CPE. The encryption may be DES based or use other encryption algorithms such as IP-SEC, etc. Various keying systems can be used and the various keying methods are well established in various standards, such as IEEE 802.11, Docsis, and others, and need not be detailed herein.

Figure 7:
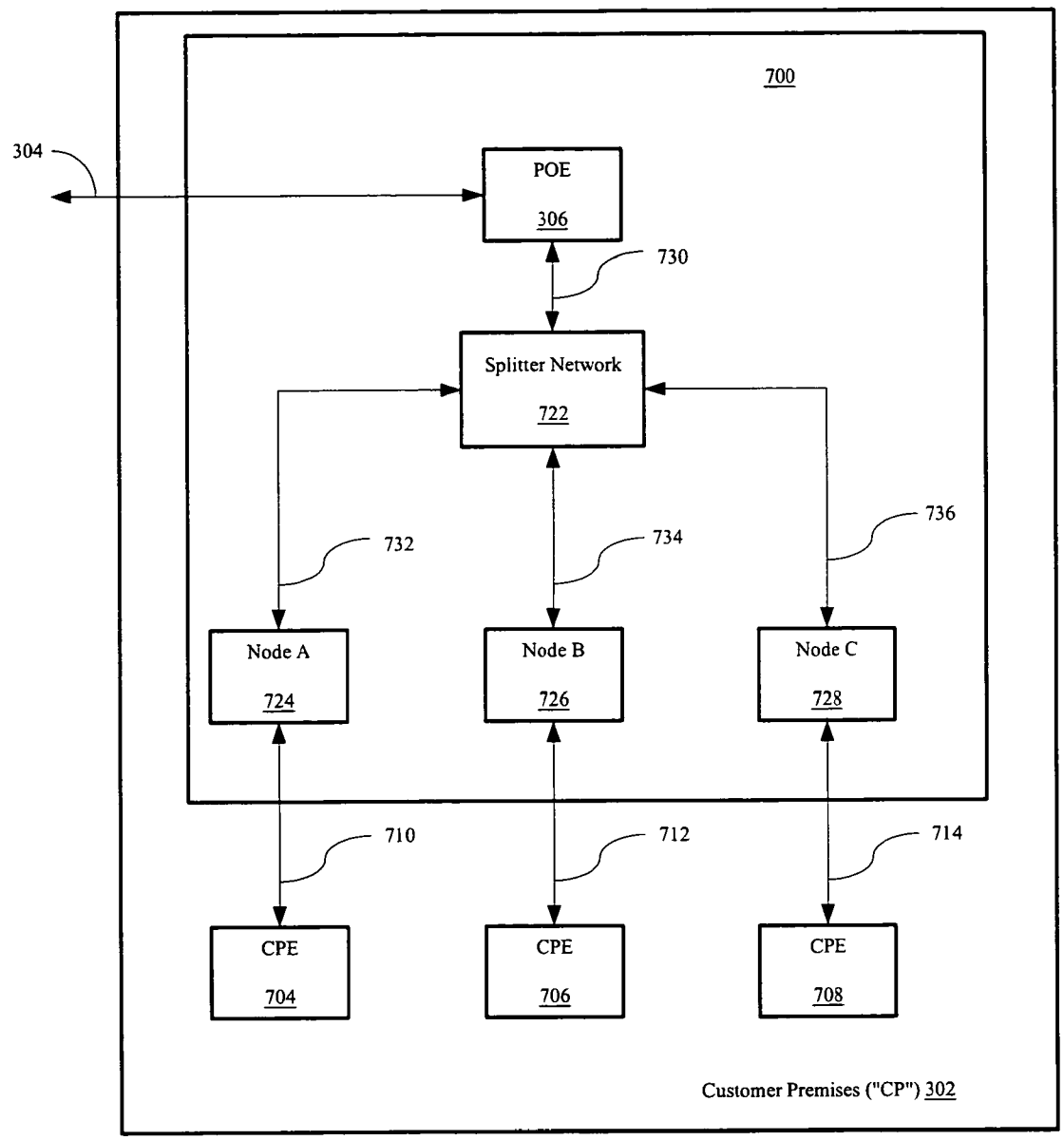
FIG. 7 is a block diagram of the BCN network of FIG. 3.

In FIG. 7, a block diagram 700 of a BCN network similar to that of FIG. 3 is shown. The coaxial cable 304 enters the premises at the POE 306. One or more passive splitters, such as passive splitter 722 may be in the BCN network 310, FIG. 3. The splitter 722 splits the signals in coaxial cable 730 into multiple coaxial cable lines 732, 734, and 736. The coaxial cable line 732 is coupled to Node A 724, coaxial cable line 734 is coupled to Node B 726, and coaxial cable line 736 is coupled to Node C 728. Each Node may have a BCN modem that transmits and receives TCP/IP (or other protocols) data over their respective coaxial cable lines 732, 734, or 736. The BCN modem also converts the data from/to a physical layer and link layers transmitted on the twisted pair Ethernet cable lines 710, 712, and 714, to the BCN network. The cable lines 710, 712 and 714 may also be USB cables, IEEE 1394 cables or any other communication connections, including printed circuit board communication lines or even communication wires inside integrated circuits. These cable lines represent any communications methods, including all layers of the communications protocol, which are then translated at Nodes A 724, B 726, and C 728, prior to transmission over the BCN network. Each CPE 704, 706, and 708 may be connected to an Ethernet cable 710, 712, and 714, respectively (or other communications methods). The different CPEs 704, 706 and 708 may communicate over the BCN network across the splitter 722.

Figure 8:
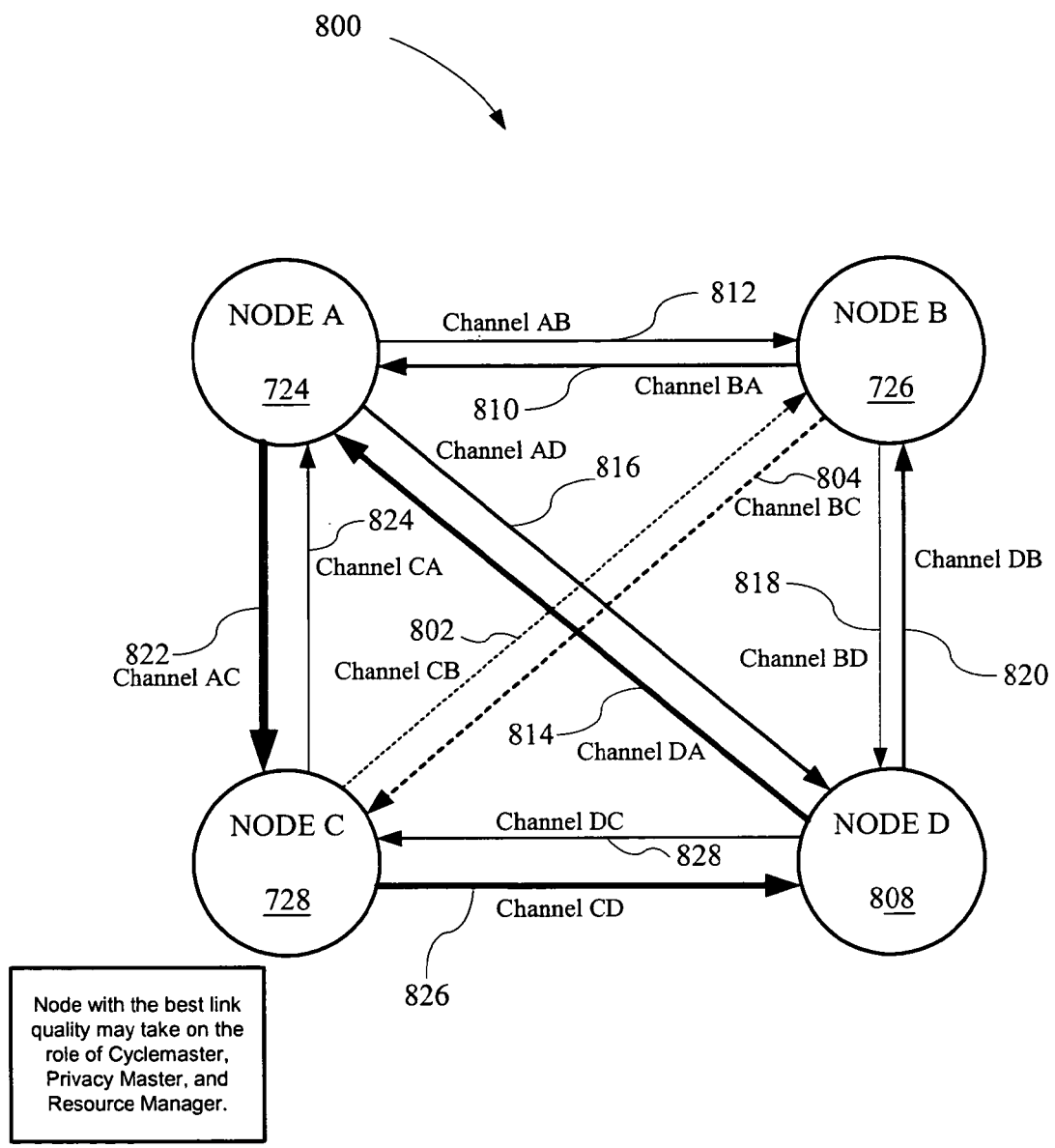
FIG. 8 is an illustration of a functional diagram showing the communication between various nodes of a network similar to the one shown in FIG. 3.

In FIG. 8, a functional diagram 800 showing the logical communication between various nodes, Node A 724, Node B 726, Node C 728, and Node D 808, in the form of a virtual logical mesh network is shown. The nodes 724, 726, 728, and 808 may be interconnected between node pairs utilizing corresponding inter-node channels between the node pairs. It is appreciated by those skilled in the art that even if the nodes are individually connected with one another via a single inter-node channel between the node pairs, each inter-node channel between node pairs may be asymmetric. Therefore, inter-node channels between Node A 724, Node B 726, Node C 728 and Node D 808 may be asymmetric and may require different modulation schemes for optimizing the specific link. Such optimization may be a different bit-loading scheme in an OFDM-based communications system or some other optimized method that optimizes the communications based on the specific channel available, which may be different on one physical link, depending on the direction of the signals between the nodes. As a result, the typically asymmetric inter-node channels between Node A 724, Node B 726, Node C 728, and Node D 808 may be described by the corresponding direction-dependent node channels AB, BA, AC, CA, BC, CB, AD, DA, BD, DB, CD, and DC.

As an example, Node A 724 is in signal communication with Node B 726 via signal paths 810 and 812. Signal path 812 corresponds to the AB channel and signal path 810 corresponds to the BA channel. Additionally, Node A 724 is also in signal communication with Node C 728 via signal paths 822 and 824. Signal path 822 corresponds to the AC channel and signal path 824 corresponds to the CA channel. Similarly, Node B 726 is also in signal communication with Node C 728 via signal paths 802 and 804. Signal path 804 corresponds to the BC channel and signal path 802 corresponds to the CB channel.

In this example, the AB channel corresponds to the channel utilized by Node A 724 transmitting to Node B 726 along signal path 812. The BA channel corresponds to the reverse channel utilized by Node B 726 transmitting to Node A 724 along signal path 810. Similarly, the AC channel corresponds to the channel utilized by Node A 724 transmitting to Node C 728 along signal path 822. The CA channel corresponds to the reverse channel utilized by Node C 728 transmitting to Node A 724 along signal path 824.

Because all links are individually optimized to maximize the throughput on each link, a multicast or a broadcast transmission is problematic. In an example of operation, in order for Node A 724 to transmit the same message to both Node B 726 and Node C 728 using the AB channel along signal path 812 and the AC channel along signal path 822, Node A 724 may need to transmit (i.e., "unicast") the same message twice, once to Node B 726 and a second time to Node C 728 if the channel pre-coding makes the optimized signal waveform on the AC channel quite different from that of the AB channel. Since the nature of communicating on the network may include a significant percentage of multicast/broadcast communications, this may have a significant impact on network efficiency if similar messages need to be repeated on each optimized link.

To maximize the network efficiency even for multicast and broadcast traffic profiles, each of the nodes utilizes the individual link optimization into a combined link optimization as follows; when a node, such as Node A, joins the network, it optimizes its transmission to each of the other nodes in the network. This optimized link is stored in the node's storage. Once a node wishes to transmit a certain message to multiple other nodes, it may do it by repeating the message multiple times or computing an optimal "multicast" transmission profile from the individual profiles in its memory. The node may also utilize a hybrid scheme if a better throughput can be achieved. In such a hybrid scheme, the node may decide to break the nodes it wishes to send the same message to into subsets of nodes that may share largely similar channel characteristics. Each of these subsets will utilize a specifically optimized channel transmission and the same message will be transmitted to all such subset groups. In actual operation, it may be that most messaging will be unicast or broadcast, so that in addition to the individually optimized transmission to each of the other nodes in the network, only a broadcast optimized transmission may be necessary. The preferred implementation of the optimized multicast or broadcast scheme in the proposed network takes advantage of the preferred bit-loaded OFDM scheme and utilizes a combined bit-loading for the subset of the channels to which a node wants to send the common message. This method is described further in the following sections.

The network topology shown in FIG. 8 is a full-mesh peer-to-peer network. The BCN modem may utilize other forms of network topology, which may include a partial-mesh network, a star network, or a combination thereof. Because in a star network, communications are always between a central node and the network nodes only, the optimized transmission is performed between the central node and the other network nodes only, and in the preferred optimization, the bit-loading scheme is established between the central node device acting as the NC and each of the remaining nodes in the network.

The BCN modems may automatically be configured as either a NC or a slave during startup. Each BCN modem is capable of transmitting and receiving on a selected control and/or broadcast channel using what is commonly referred to as precoding. The selected broadcast channel is selected as a channel having sufficient quality to enable all BCN modems to communicate with the NC.

If a BCN modem is started and it does not detect a control channel with a NC BCN modem, then it assumes the role of a NC. Otherwise a NC BCN modem is detected and the BCN modem starting up is configured as a slave BCN modem. For example, when Node A 724 starts up first and assumes the role of NC, the other Nodes B 726 and Node C 728 start up later as slave BCN modems. If two or more BCN modem start up at the same time, a random back-off timer may be used to stagger the establishment of a NC BCN modem. Further, if the network is divided, a BCN modem slave will determine that no NC is present and assume the role of the NC.

Once a NC, such as Node A, is established, the quality of the data paths to and between the other nodes is determined. There may be multiple communications paths between Node A and the other nodes due to the signal reflections that may occur at splitters and other network connections. The data paths for communication between selected nodes is determined and the path between one node to multiple nodes commonly called multicast is determined. It may not be true that the best signal quality path for a pair of nodes will be the best quality for a multicast to the pair of nodes and one or more other nodes. Often there may be a common channel that has an acceptable quality for all the nodes involved in the multicast.

The multicasting is typically setup at the link layer of the protocol with a multicast group and members join and leave the group as required. A multicast address translation protocol may map up to 64 multicast channels to unique BCN modem channels. Further, either the NC or slave BCN modem may initiate a multiCast session.

Figure 9:
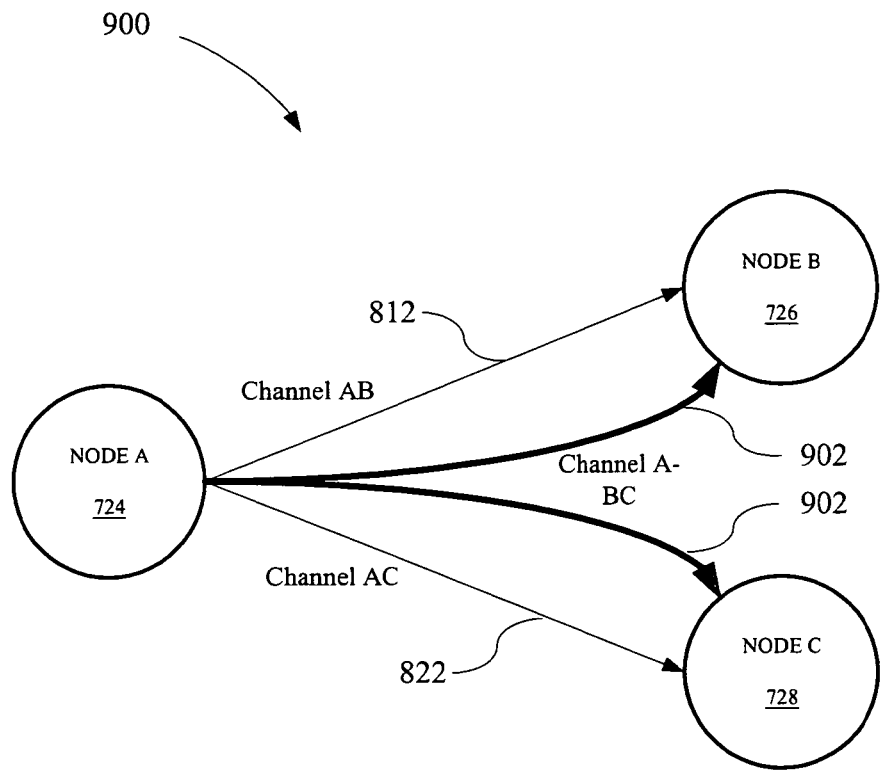
FIG. 9 is another functional diagram showing the interfaces and functional relationships between the Nodes of a network similar to the one shown in FIG. 3.

In FIG. 9, another functional diagram 900 showing the interfaces and functional relationships between the Nodes of FIG. 3 is shown. In this diagram, Node A 724 may transmit a message in broadcast or multicast mode simultaneously to Node B 726 and Node C 728 channel via signal paths 812 and 822. When the network was established, Node A 724 had optimized its communications with Node B 726 as channel AB. Also, Node A 724 optimized its communications with Node C 728 as channel AC. If Node A 724 needs to transmit a message to Node B 726 or Node C 728, it utilizes the optimized transmission for channel AB or channel AC, respectively. However, once Node A 724 wishes to transmit a message to both Node B 726 and Node C 728 simultaneously, it may not be able to do it effectively if the optimized transmissions for channel AB and channel AC are different. Node A 724 may transmit the message twice, once to Node B 726 with an optimized transmission to channel AB, and once to Node C 728, with an optimized transmission to channel AC. However, analysis has shown that there is a better and more efficient way to transmit the same message to both Nodes B 726 and C 728. Node A 724 can optimize the transmission to a new channel denoted as channel A-BC. This optimized transmission is the best transmission for messages destined to both Nodes B 726 and C 728. Extensive analysis on models of real cable systems have shown that in most cases, such method is preferred and yields a better throughput compared to repeating the message for optimized channels AB and AC. In the implementation discussed herein, the optimization for channel A-BC is relatively straightforward. Because each of the optimizations for channel AB and channel AC are done by bit-loading according to the frequency responses of paths 812 and 822, channel A-BC optimized transmission is the one that optimizes the bit-loading for the combined response of paths 812 and 813.

It is appreciated by those skilled in the art that the different channels typically utilize different bit-loading modulation schemes, because the channels typically are physically and electrically different in the BCN network. Physically the channels often vary in length between nodes and electrically vary because of the paths through and the reflections from the various cables, switches, terminals, connections, and other electrical components in the BCN network. A bit-loading scheme is described in U.S. Utility application Ser. No. 10/322,834 titled "Broadband Network for Coaxial Cable Using Multi-carrier Modulation," filed Dec. 18, 2002, which is incorporated herein, in its entirety, by this reference.

In another implementation, the BCN network may operate with waveforms that utilize bit-loaded orthogonal frequency division multiplexing (OFDM). Therefore, the BCN network may transmit multiple carrier signals with different QAM constellations on each carrier. As an example, over a bandwidth of about 50 MHz, the BCN network may have 256 different carriers that in the best circumstances would utilize up to 256 QAM modulations. However, the modulation of each carrier may be adjusted according to the specific channel response. If at certain frequencies, the response is poor, the BCN network may utilize BPSK or a low order QAM for carriers in those frequencies. If the channel is good in some other frequencies, then a high order QAM can be utilized on those frequencies which is the essence of bit-loading optimization.

Figure 10:
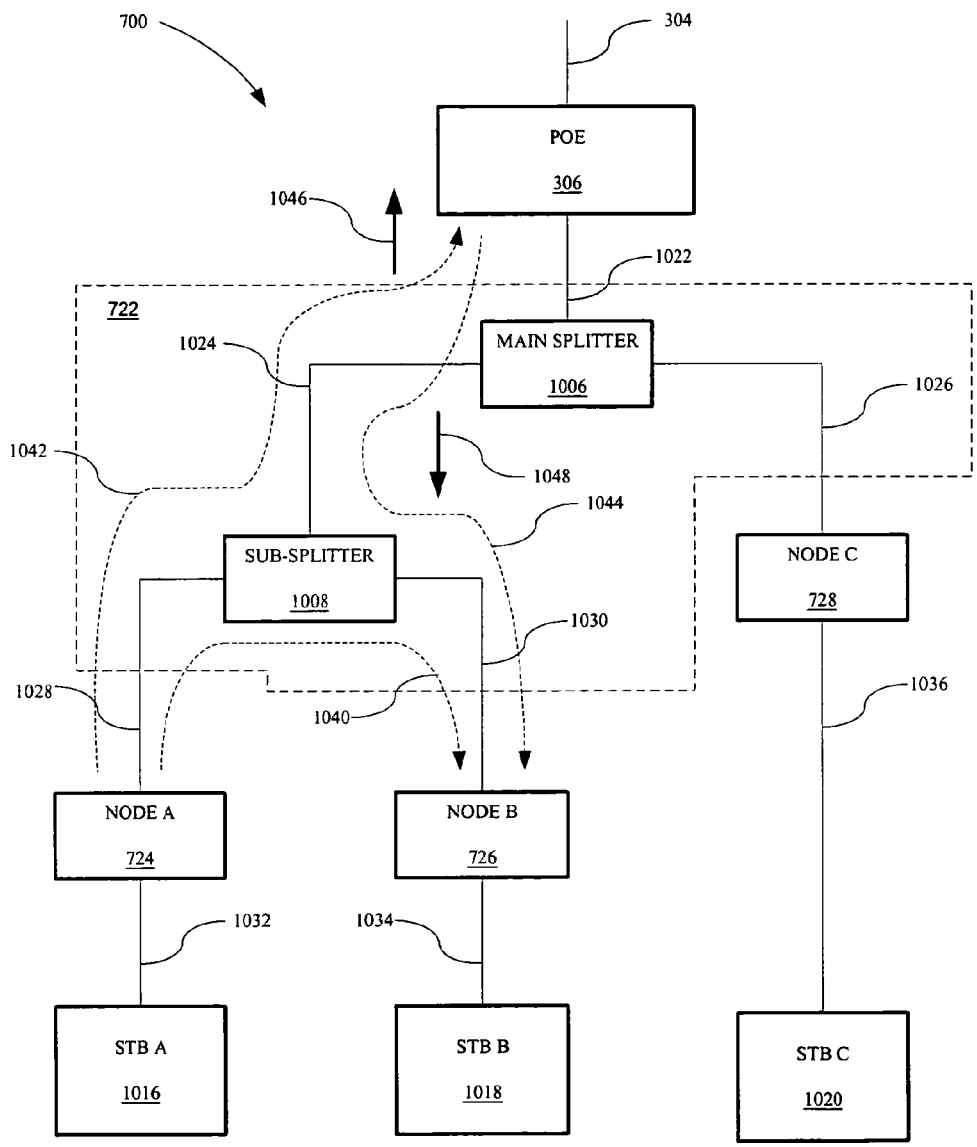
FIG. 10 shows a block diagram of another example implementation and signal flows of a BCN network

The application of bit-loading in a BCN network is demonstrated in FIG. 10. As an example, in FIG. 10, a block diagram of the BCN network 700 of FIG. 7 is shown. The BCN network 700 may be in signal communication with a cable provider (not shown), satellite TV dish (not shown), and/or external antenna (not shown) via a signal path 304, such as a main coaxial cable from the customer premises to a cable connection switch (not shown) outside of the customer premises.

The BCN network 700 may include the POE 306 and splitter network 722 that has a main splitter 1006, a subsplitter 1008, Nodes A 724, B 726 and C 728, and STBs A 1016, B 1018 and C 1020. Within the BCN network 700, the POE 306 may be in signal communication with the main splitter 1006 via signal path 1022. The POE 306 may be implemented as a coaxial cable connector, transformer and/or filter.

The main splitter 1006 may be in signal communication with sub-splitter 1008 and Node C 728 via signal paths 1024 and 1026, respectively. The sub-splitter 1008 may be in signal communication with Node A 724 and Node B 726 via signal paths 1028 and 1030, respectively. The main splitter 1006 and sub-splitter 1008 may be implemented as coaxial cable splitters. Node A 724 may be in signal communication with STB A 1016 via signal path 1032. Similarly, Node B 726 may be in signal communication with STB B 1018 via signal path 1034. Moreover, Node C 728 may be in signal communication with STB C 1020 via signal path 1036. STBs A 1016, B 1018 and C 1020 may be implemented by numerous well known STB coaxial units, such as cable television set-top boxes and/or satellite television set-top boxes. Typically, the signal paths 304, 1022, 1024, 1026, 1028, 1030, 1032, 1034, and 1036 may be implemented utilizing coaxial cables.

As an example of operation, if STB A 1016 transmits a message to STB B 1018, the message will propagate through at least two transmission paths from Node A 724 to Node B 726. The first transmission path 1040 travels from Node A 724 through signal path 1028, leakage between output ports in sub-splitter 1008, and signal path 1030 to Node B 726. The second transmission path includes transmission sub-paths 1042 and 1044. The first sub-path 1042 travels from Node A 724 through signal path 1028, sub-splitter 1008, signal path 1024, main splitter 1006, and signal path 1022 to POE 306. The message may reflect due to less than ideal termination at the input or output of the POE 306 and go back through the second sub-path 1044. The second sub-path 1044 travels from POE 306, through signal path 1022, main splitter 1006, signal path 1024, sub-splitter 1008, and signal path 1030.

The first transmission path 1040 typically tends to experience a certain attenuation because of the isolation between the output ports of sub-splitter 1008. The second transmission path 1042 attenuation results mostly from the reflection at the POE 306 due primarily to impedance mismatches between the input or output of POE 306 and the rest of the BCN network 700. Of course, there may be additional paths the signal can travel through due to other reflections in the various paths of the BCN network 700. The result of all these multiple transmission paths is a potentially extensive dispersive channel between STB A 1016 and STB B 1018. This channel, however, is fairly static and does not change rapidly.

Figure 11:
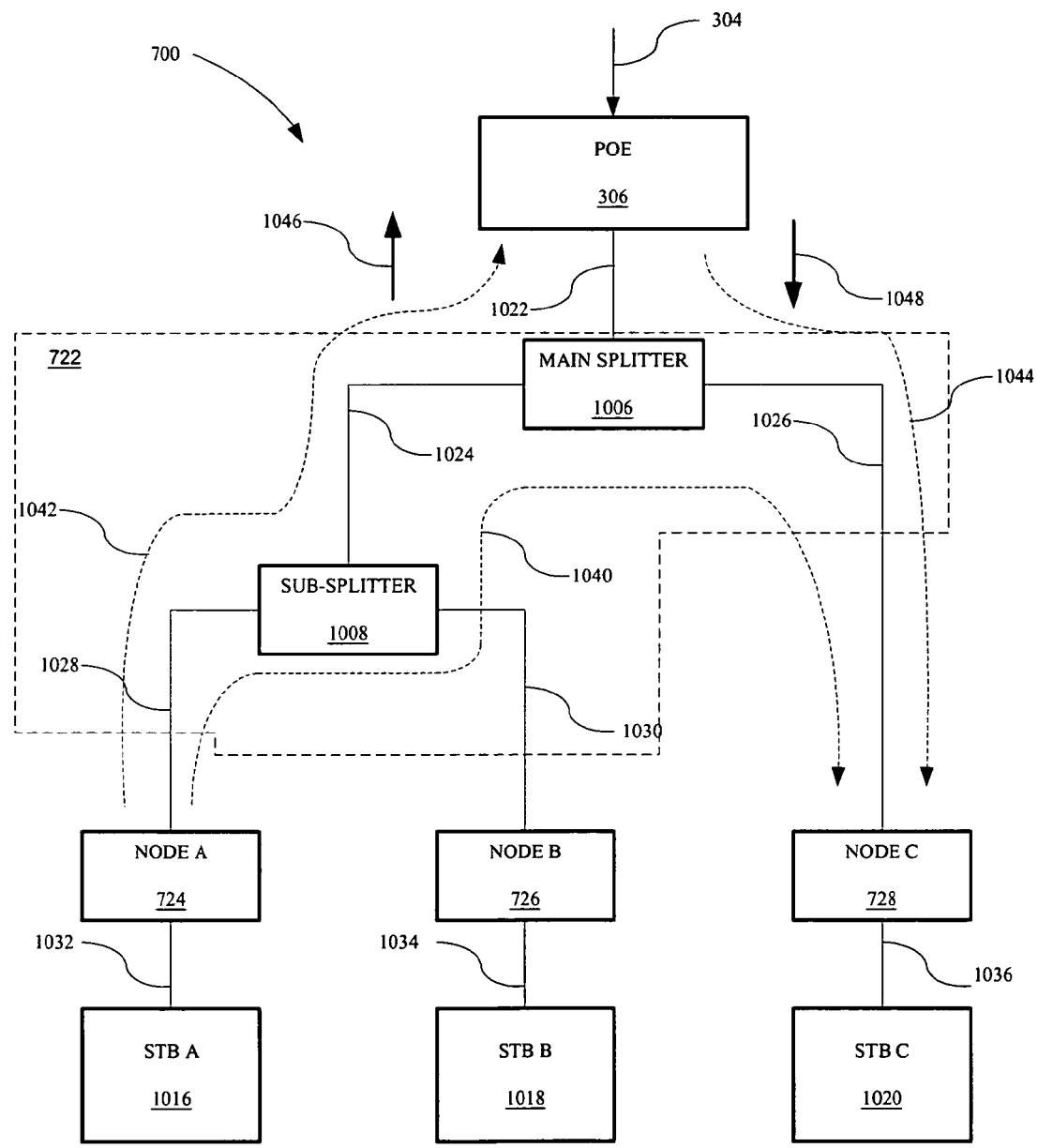
FIG. 11 illustrates another block diagram of another example implementation and signal flows of a BCN network.

As another example, in FIG. 11, the communications between STB A 1016 and STB C 1020 is described for the BCN network of FIG. 10. In this example of operation, if STB A 1016 transmits a message to STB C 1020, the message will propagate through two or more transmission paths from Node A 724 to Node C 728. Two transmission paths of this example are shown in FIG. 11. The first transmission path 1040 travels from Node A 724 through signal path 1028, sub-splitter 1008, signal path 1024, and signal path 1026 to Node C 728, with leakage between the output ports of the main splitter 1006. A second transmission path includes transmission sub-paths 1042 and 1044 and the reflection at the input and/or the output of the POE 306.

In the example of FIG. 11, it is to be expected that the dispersal may be of a different nature than that of FIG. 10 because the leakage through the main splitter 1006 output ports is likely to be different compared to the leakage between the output ports of the sub-splitter 1008, and the difference in path lengths between the two transmission paths in the example of FIG. 11 is likely to be smaller because it includes only the traversing of the path 1022 twice, once on the way to the POE 306 and once on the way back. In contrast, in the example of FIG. 10, the difference in the paths includes the traversing twice of both the 1022 and 1024 paths.

Figure 12:
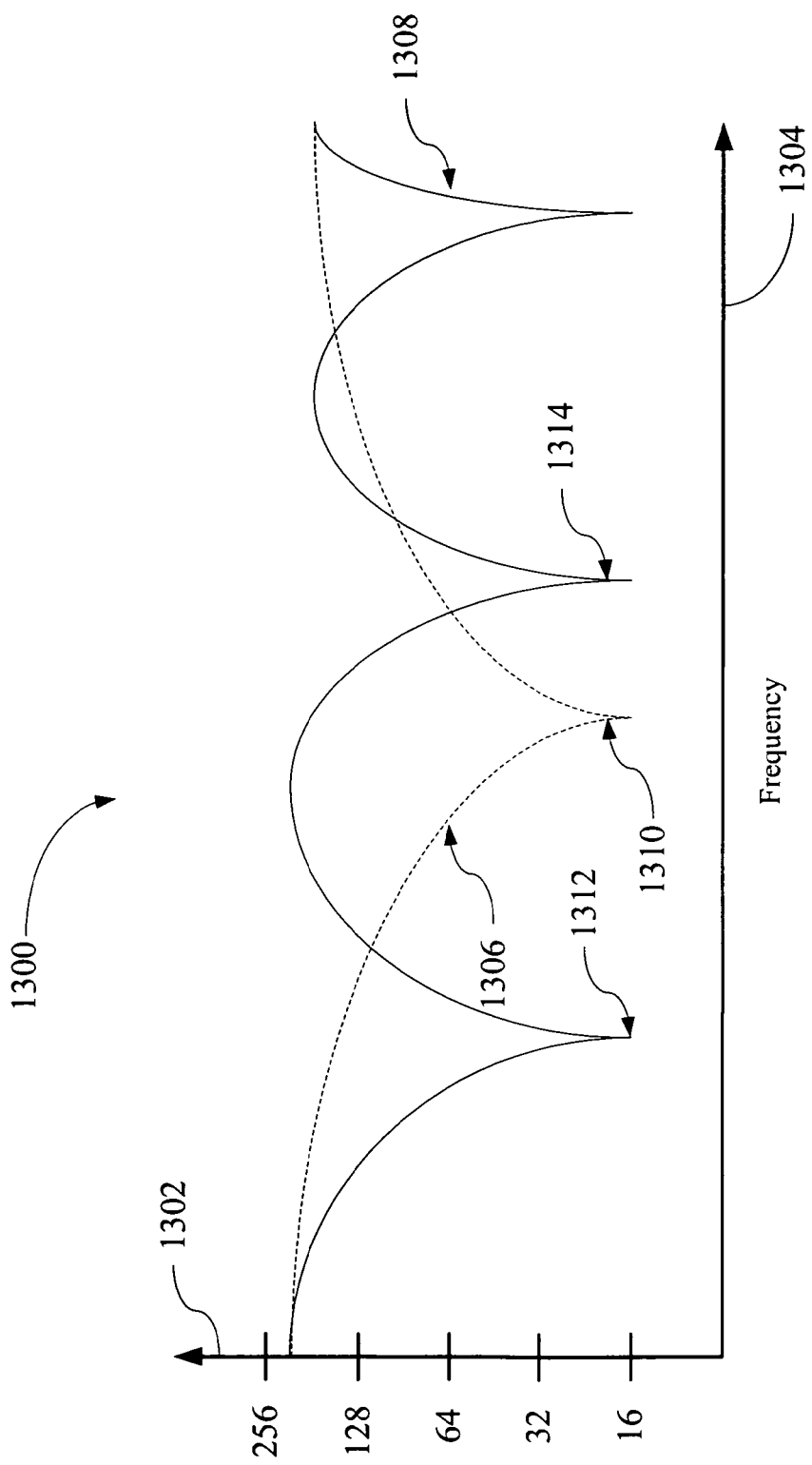
FIG. 12 shows a plot of an example bit-loading constellation versus frequency.

In FIG. 12, a plot 1200 of the frequency response of the Node A to Node B 1208 two transmission path and the Node A to Node C 1206 two transmission path is shown. In both channels, the two transmission paths have similar attenuation, resulting in a frequency response with deep notches. This occurs at frequencies where the phase difference through the two paths is 180 degrees, resulting in the cancellation of the signal because their amplitude is identical. It may be noted that the frequency response of the Node A to Node B 1208 transmission path contains more notches per unit frequency than the Node A to Node C 1306 transmission path because its path time difference is larger. Similarly, because the time difference between the two paths of the Node A to Node C channel is smaller, the frequency difference between the notches in its frequency response is larger, as should be expected. Thus, FIG. 12 illustrates that in order to communicate between Node A and Node B, or between Node A and Node C, a special waveform may be required in order to deal effectively with the respective channels. Moreover, these channel responses are likely to be different in different cable systems and also are likely to change in time due to a change in configuration, such as when a user may add new devices to his cable system or change its topology, or due to slowly occurring changes caused by aging or changes in temperature or humidity that can change the leakage through the devices. Hence, the transmission system needs to constantly adapt to changing channel conditions.

In the example implementation, such adaptation is performed through a technique of OFDM modulation combined with an optimized bit-loading. In an OFDM optimized bit-loading, the modulation for each carrier is adapted to the channel response and noise (and interference) at the carrier frequency. FIG. 12 shows an example of bit-loading constellation 1202 versus frequency 1204 for the channel path utilized by Node A to transmit to Node B 1208 and the channel path utilized by node A to transmit to Node C 1206. Line 1208 represents the AB channel and line 1206 represents the AC channel. As can be seen from FIG. 12, at frequencies where the frequency response provides good transmission path and depending on the noise level, the BCN network may utilize high order modulation to permit better throughput at these frequencies. The modulation axis 1202 shows the QAM level (16, 32, 64 . . . 256) corresponding to a given frequency response level 1206 and 1208 at a given frequency 1204. Around the notch frequencies 1212 and 1214 of the response 1208 and 1210 of the response 1206, nothing at all may be transmitted because the notch is very deep. Sufficient margin may be provided to ensure that the selected modulation provides the necessary Bit Error Rate ("BER") and allows for small changes in the response. Additional QAM levels such as 2-QAM, also known as BPSK, and 4-QAM, also known as QPSK, can be used but are not shown in FIG. 12.

Returning to FIG. 9, the BCN network 900, in order to ensure that both Node B 726 and Node C 728 are able to receive a broadcast signal transmitted from Node A 724, utilizes a bit-loading modulation scheme that is known as the common bit-loaded modulation scheme. The common bit-loaded modulation scheme transmitted via the A-BC channel, along signal path 902, is a combination of the bit-loading modulation scheme transmitted via the AB channel, along signal path 812, and the AC channel, along signal path 822.

Figure 13A:
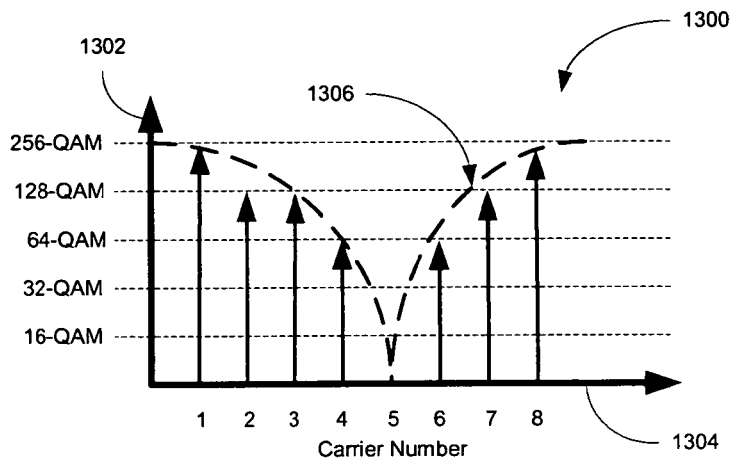
FIG. 13A shows a plot of the bit-loading constellation versus carrier number for the channel path between node A and node B of FIG. 7.
Figure 13B:
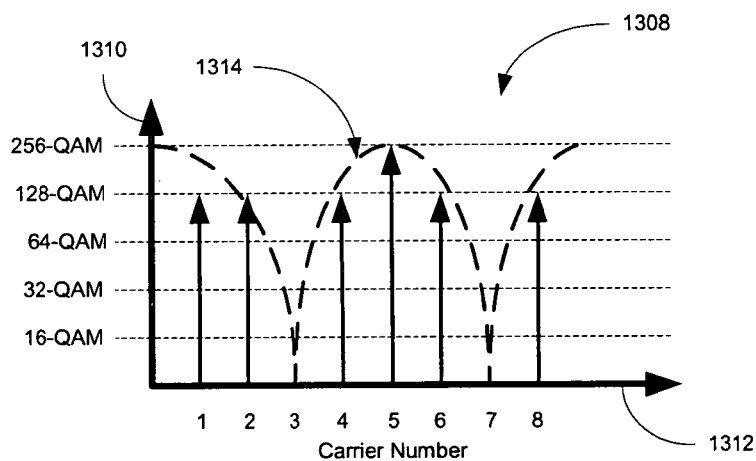
FIG. 13B shows a plot of the bit-loading constellation versus carrier number for the channel path between node A and node C shown in FIG. 7.
Figure 13C:
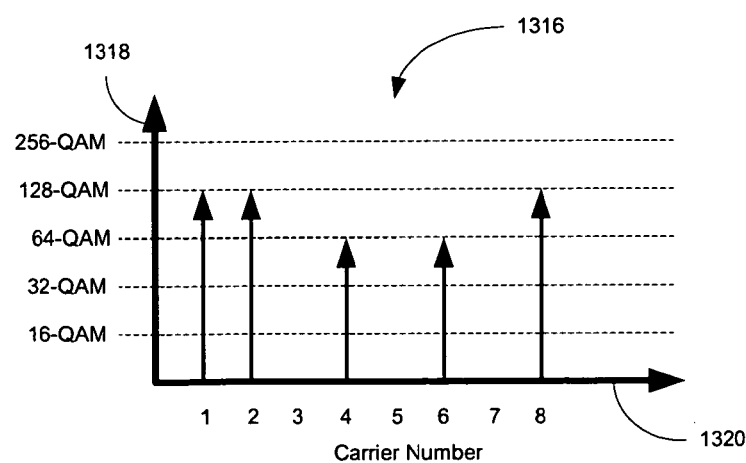
FIG. 13C shows a plot of the bit-loading constellation versus carrier number for the resulting broadcast channel path between node A and node B and node A and node C based on the constellations shown in FIGS. 13A and 13B.

FIGS. 13A, 13B and 13C provide examples of common bit-loading. In FIG. 13A, a plot 1300 of carrier frequency signals of various bit-loading constellations 1302 versus carrier number 1304 for the AB channel path such as that of FIG. 9 between Node A and Node B is shown. Line 1306 represents the AB channel frequency response and a corresponding envelope of the constellation sizes of 8 different carrier signals numbered 1-8 within the transmission signal for the AB channel. In the example, within the AB channel the transmitted OFDM signal includes the individual carriers with different modulation constellations, such as carrier number signals 1 and 8 that may transmit at a constellation size of 256 QAM, carrier number signals 2, 3 and 7 that may transmit at a constellation size of 128 QAM, carrier number signals 4 and 6 that may transmit at a constellation size of 64 QAM, and carrier number signal 5 that may be OFF (i.e., no carrier signal may be transmitted because of the null in the channel response).

Similarly in FIG. 13B, a plot 1308 of a frequency response 1314 and the corresponding bit loading scheme 1310 vs. frequency 1312 for the OFDM carrier frequency signals for the AC channel such as that of FIG. 9 is shown. Again, line 1314 represents the AC channel response and there is a corresponding envelope of the constellation sizes of the 8 different carrier number signals within the AC channel. As an example, within the AC channel, carrier number signals 1, 2, 4, 6 and 8 may transmit at a constellation size of 128 QAM, carrier number signal 5 may transmit at a constellation size of 256 QAM, and carrier number signals 3 and 7 may be OFF (again, no carrier signals may be transmitted because of nulls in the channel response).

In FIG. 13C, a plot 1316 shows the common bit-loading scheme of the OFDM carriers constellations 1318 versus carrier number 1320 for broadcasting messages over the A-BC channel path between Node A and Nodes B and C. In this example, plot 1316 shows that within the A-BC channel, an OFDM signal consisting of carrier number signals 1, 2, and 8 may transmit at a constellation size of 128 QAM, carrier number signals 4 and 6 may transmit at a constellation size of 64 QAM, and carrier number signals 3, 5, and 7 are OFF. These carrier number signal values are the result of comparing the carrier number signals from the AB channel in FIG. 13A and the corresponding carrier number signals from the AC channel in FIG. 13B and choosing the lowest corresponding modulation value for each carrier number. The resulting common carrier frequency signals in FIG. 13C graphically represent signals utilizing the common bit-loaded modulation scheme. These signals would be able to transmit information from Node A to Node B and Node C simultaneously.

Figure 14:
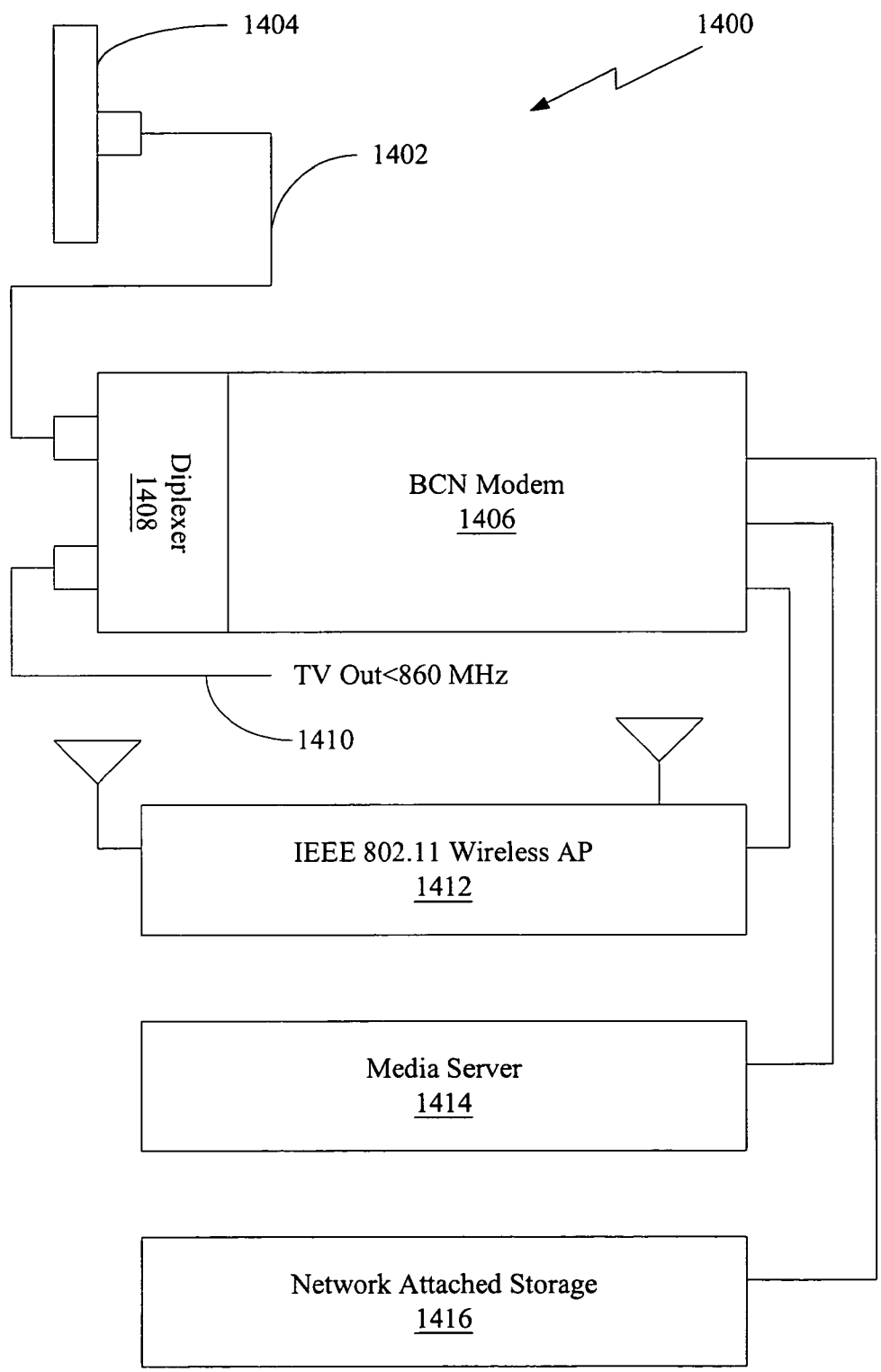
FIG. 14 shows an example block diagram of an Ethernet to Coax bridge node in a BCN network.

Turning to FIG. 14, a block diagram of an Ethernet bridge node of the BCN network 700 for FIG. 7 or FIG. 3 is shown. The BCN network cable 1502 may be connected to a standard coaxial cable wall plate 1504, such as those made by LEVITON. The Coaxial wall plate 1404 may secure to the cable 1402 via a connector, such as a F-type or BNC connector. Typically the cable may be 75-ohm RG-59, some type of RG-6, or a combination of such 75-ohm cables. The Ethernet to Coax Bridge Device 1406 may have a diplexer 1408 that passes the RF frequencies below 860 MHz to a cable 1410 that may be connected to a video type device (not shown), such as a television, VCR, Audio/Visual Receiver, or television tuner PC card.

The Ethernet to Coax Bridge Device 1406 may have a BCN modem 1404 that connects to a BCN network such as that shown in FIG. 3 and FIG. 7, and that enables it to code and decode messages between connected devices such as a wireless access point 1412, media server 1414 or a network attached storage 1416 for transport across the BCN network through the cable 1402. The various devices wishing to communicate over the BCN Network to other devices in other bedrooms communicate by using standard Ethernet packets. The Ethernet to Coax Bridge (ECB) provide Ethernet bridging, switching and/or routing functions for all connected devices to other devices connected over the BCN network. Hence, a laptop (not shown) may be connected wirelessly to the Wireless AP 1412. The Wireless AP may route the Laptop packets to other devices connected to the ECB or through the BCN Network, to other devices in other rooms that are connected to the BCN Network through other ECBs or directly to STBs, PCs, TVs, gateway and any other device that is capable of communications over the BCN network through a BCN modem. Similarly, the Media Server 1414 may communicate through the ECB to TV sets, other Media Servers or Media Extenders connected to the BCN Network in any room. The ECB may operate a bridge, switch and or router over an Ethernet network. However, its functionality spans not only any Ethernet segment it is connected to but also across the full BCN Network, providing a full Layer 2 and upper layers functionality across the whole BCN network and other networks through gateways. Due to the capabilities of the BCN Network, the ECBs may provide high levels of Quality of Service ("QOS"), including network wide priorities such as IEEE 802.1p, and even higher level of QOS services including prioritized flow control for selected flow across the network. These capabilities are inherent in the BCN Network and can be utilized by all the devices connected to the BCN Network including ECBs.

Figure 15:
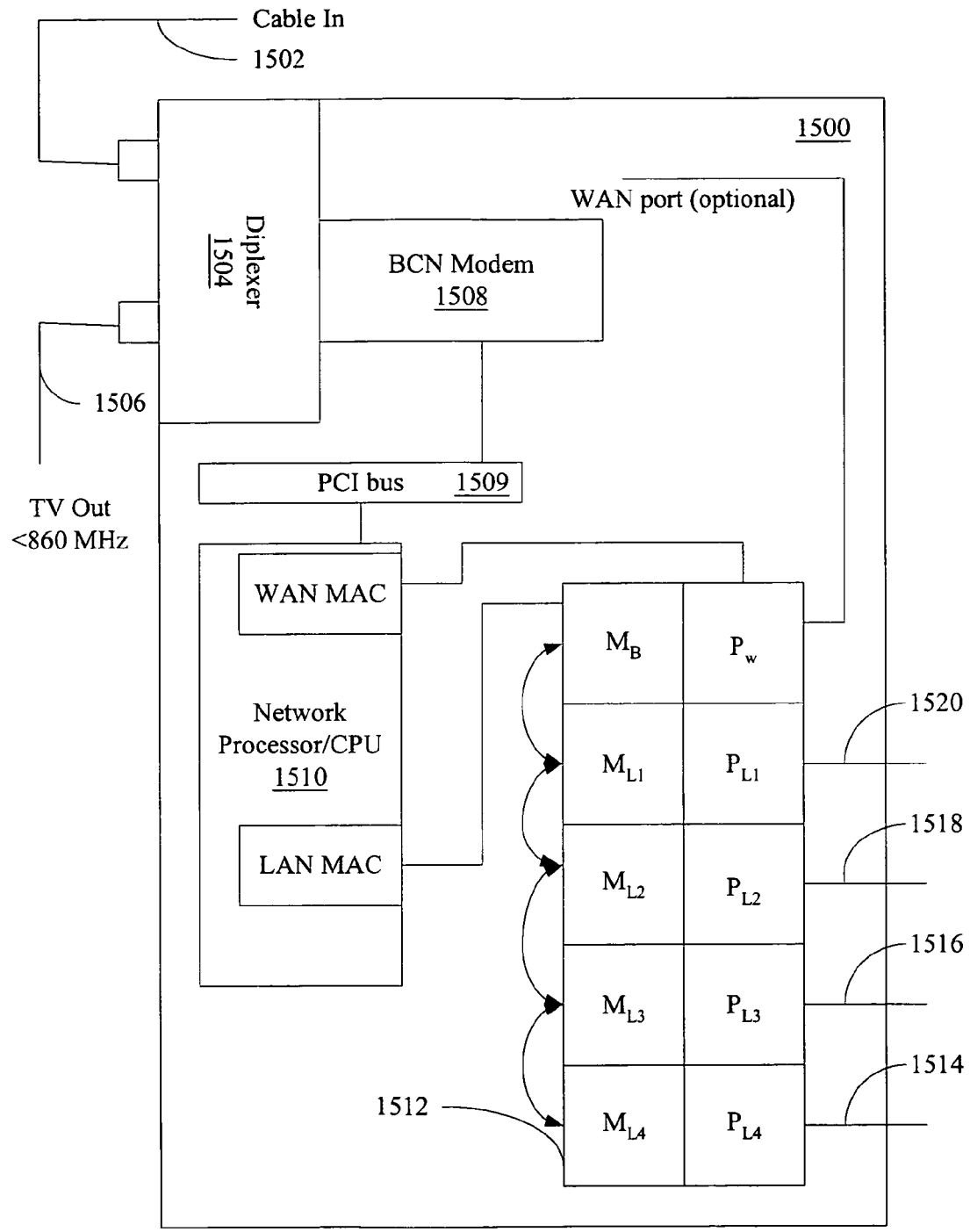
FIG. 15 is a block diagram of one implementation of a multi-port Ethernet to coax bridge/router.

In FIG. 15, a cable home gateway/router node 1500 is shown. The cable home gateway/router node 1500 is connected to BCN network by a cable 1502. The cable home gateway/router node 1500 may have a diplexer 1504 that passes RF frequencies below 860 MHz to another cable 1506 that may be connected to a video type device or any other cable device that utilizes frequencies below 860 MHz, such as a STB, TV set, cable modem, etc. A BCN modem 1508 may be connected to BCN network cable 1502 via the diplexer 1504. The BCN modem 1508 may also be connected to a network processor/CPU 1510, such as a host microprocessor, digital signal processor, or other known digital controllers by an electrical bus, such as a PCI bus 1509 or any other internal or external parallel or serial high speed bus.

The Network Processor/CPU 1510 may be configured to support WAN connectivity, such as the Docsis cable modem communication standard for data communication with a cable head end or DSL, dial-up connection, or Wireless Access through a WAN port. This port may or may not support MAC functions, but may transmit and receive WAN Packet Data Units to the WAN port 1524. Further, the Network Processor/CPU may support other connections, such as USB1.0, USB2.0, or other networking technologies. A N-port switch (4-port shown) 1612 may also be incorporated into the cable home gateway node/router 1500. The ports 1514, 1516, 1518, and 1520 (typically called local area network ports) may be coupled to Ethernet network devices (not shown). The cable home gateway/router node 1500 may also provide multiple networking functions, including gateway functions, e.g., WAN to/from LAN packet transmission and protocol conversions, LAN switching and/or routing functions and protocol conversions between the multiple LAN and WAN functions, which may include one or more BCN networks.

Figure 16:
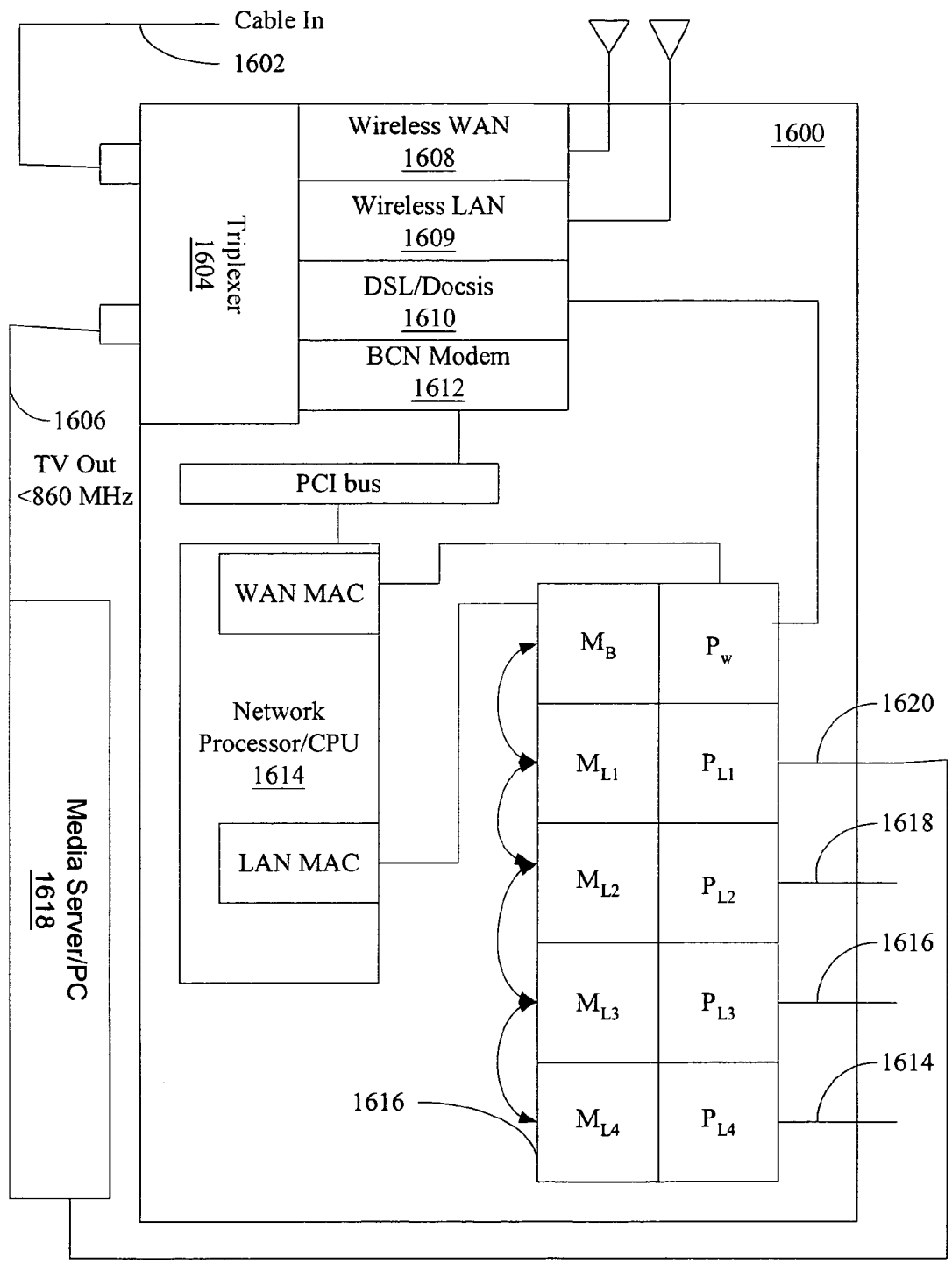
FIG. 16 is a block diagram of an Ethernet bridge/router with additional WAN and LAN ports including DSL/Cable Modem and wireless.

Turning to FIG. 16, an integrated Ethernet bridge/router with integrated WAN modems ("IEBR") 1600 is shown. In this example implementation, the functionality and options of the bridge/router of FIG. 15 is integrated with the functionality of cable modem and/or DSL and/or wireless access, and also with wireless LAN connectivity as additional local ports. A BCN network cable 1602 is connected to a triplexer 1604 that may pass RF frequencies less than 860 MHz on another cable 1606 to a video device (not shown). The triplexer 1604 may also be coupled to a Docsis cable modem 1610 and a BCN modem 1612. The IEBR 1600 also may have a DSL modem that interfaces to a telephone line (not shown) and also to a wireless WAN access modem 1608. The IEBR 1600 may also be connected to a network processor 1614 and support an N-port switch (4-port switch shown) 1616 and a wireless LAN 1609. Each of the ports of the N-port switch may be connected to an Ethernet enabled device, such as a media server/PC 1618. The media server/PC 1618 may also be connected to the other cable 1606. The functionality of the integrated router/WAN modem is similar to that of FIG. 15 but is integrated with the WAN modems and a wireless LAN.

Figure 17:
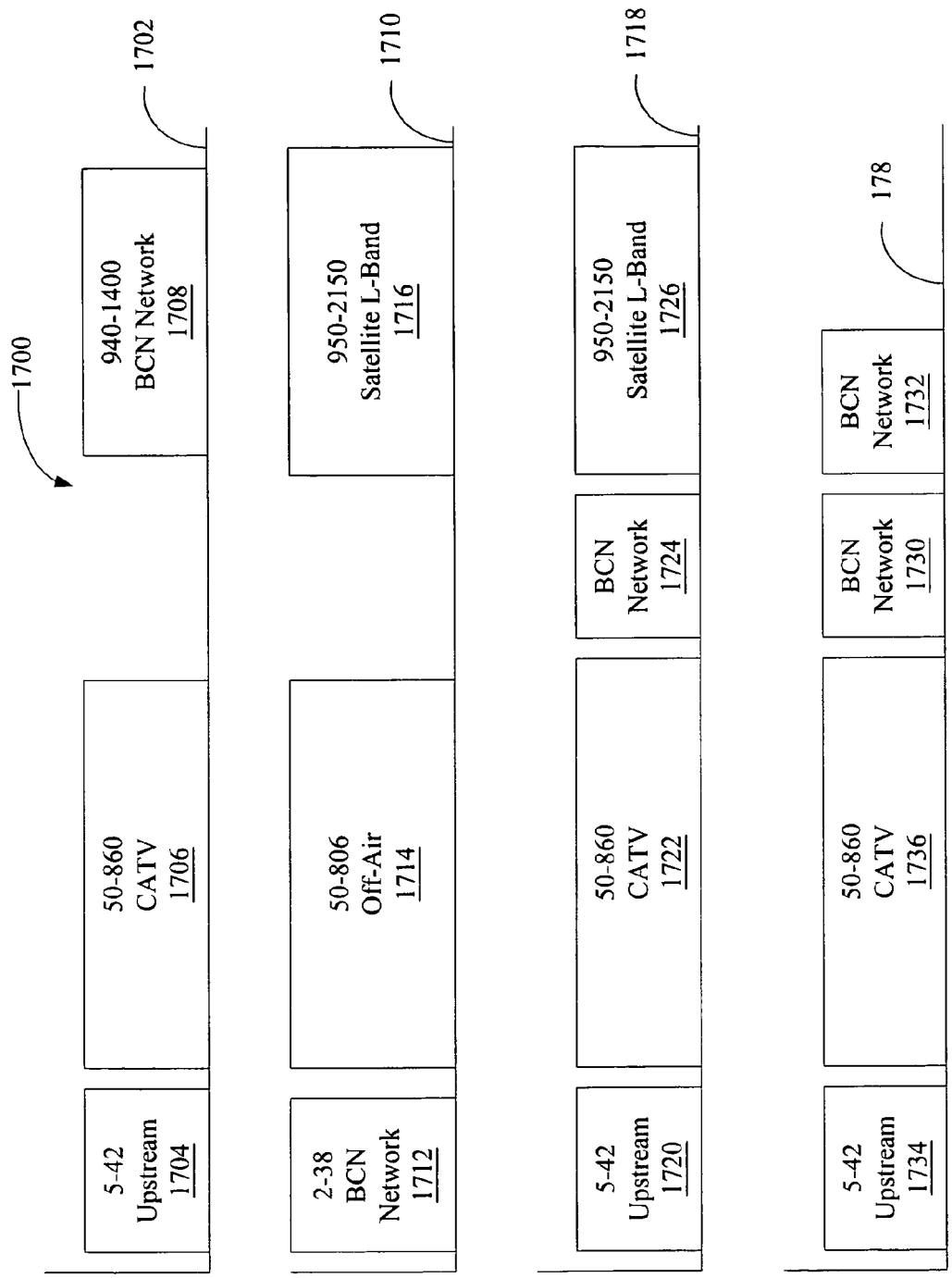
FIG. 17, an illustration of various frequency plans for use of the BCN network in different home environments that may include satellite, cable, telco or other services.

In FIG. 17, a diagram 1700 of frequency plans is illustrated. In most two-way cable systems 1702, an upstream frequency band is located in the 5-42 MHz band 1704. Analog and digital cable television signals and cable modem downstream carriers are found in the 50-860 MHz band 1706 and the BCN network 1708 is located between 940-1400 MHz. In theory, the BCN network can be located above 860 MHz, but in order to allow diplexers in systems that may require it, it may be prudent to allow a certain frequency band for the filters roll-off. A different implementation, such as the network shown in FIG. 4 or one where the BCN network is not connected to cable at all and is available exclusively for satellite use, is shown in FIG. 17, 1710. In this implementation, the BCN network 1712 may be located between 2-38 MHz and off-air signals 1714 between 50-806 MHz. The Satellite L-Band 1716 may be located between 950-2150 MHz. In yet another implementation 1718, the system operates on a BCN Cable Network that is capable of providing both satellite and cable services. In this case, the cable upstream frequency band 1720 may be present between 5-42 MHz, the cable TV signals between 50-860 MHz 1722, the BCN network 1724 in a frequency band found between 880 and 940 MHz, and satellite L-band 1726 located between 950-2150 MHz. The final implementation 1728 demonstrates the application over cable systems where two or more distinct BCN networks 1730 and 1732 located above the 5-42 upstream frequency band 1734 and cable TV 50-860 frequency band are utilized. In this frequency plan, although only two BCN Networks, 1730 and 1732, are shown, many more may be placed above the ones shown in this frequency plan. Thus, it is shown that BCN networks may be located above or below traditional services in addition to there being multiple BCN networks.

Figure 18:
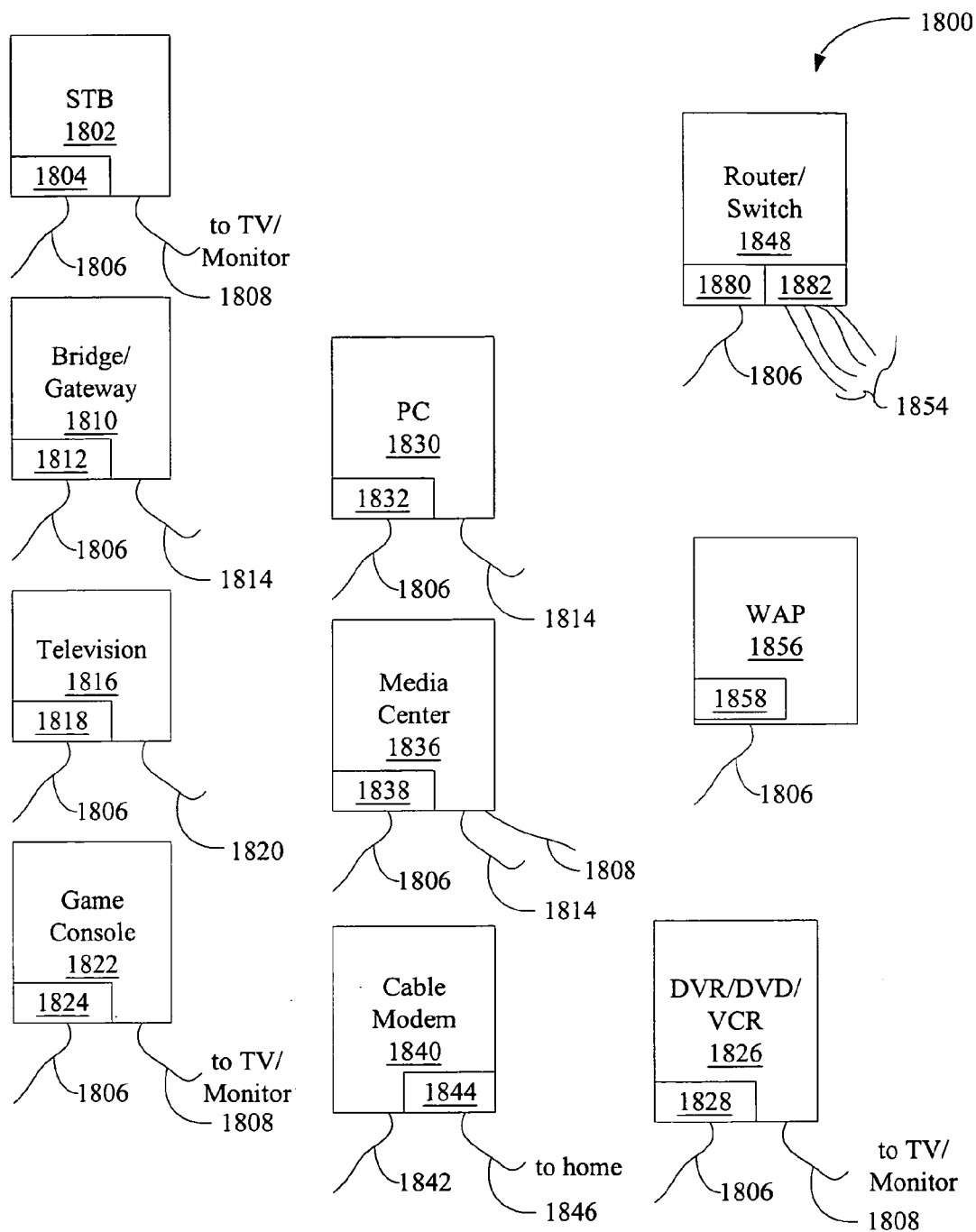
FIG. 18 is diagram of a plurality of BCN modem enabled and corresponding devices.

Turning to FIG. 18, a plurality of BCN modem enabled devices 1800 is shown. The first device is STB 1802 having a BCN modem 1804 with a coaxial cable input 1806 and an output 1808 (optional) that may be connected to a TV or monitor. A bridge/gateway 1810 is shown with a BCN modem 1812 attached to a coaxial cable connection 1806 and an output, such as Ethernet, USB1.1 or USB2.0 or IEEE 1394 connected to another network 1814. A television set 1816 is shown with a BCN modem 1818 connected to a coaxial cable 1806 and optionally connected to an internal or an external optional storage device 1820. A game console 1822 is shown with a BCN modem 1924 connected to coaxial cable 1906 and another optional connection 1808 to a TV or monitor. A digital video recorder (DVR)/DVD device/video cassette recorder (VCR) 1826 is shown with a BCN modem 1828 connected to a coaxial cable 1806 and having another optional connection 1808 to a TV or monitor. A PC 1830 may have a BCN modem 1832 connected to coaxial cable 1806 and may have another connection 1814, such as USB, IEEE 1394, serial and/or Ethernet to name but a few. Similarly, a media center 1836 may have a BCN modem 1938 connected to a coaxial cable 1806 and other optional connections such as 1808 to a monitor or a TV set and/or a second connection 1814 to other devices. A cable modem 1840 may be connected to a cable system 1842 and have a BCN modem 1844 connected to the same or another segment of a coaxial cable 1846 or another type of home networking connection such as Ethernet, wireless AP, powerline network, HPNA, etc. A router/switch 1848 may have a BCN modem 1850 connected to a coaxial cable 1806 and may provide multiple outputs for Ethernet, USB, IEEE 1394 or other types and combinations of networking connections 1854. A wireless access point 1856 may have a BCN modem 1858 connected to a coaxial cable 1806. These are examples of different types of devices that may benefit from having a BCN modem functionality and technology integrated within their designs.

Figure 19:
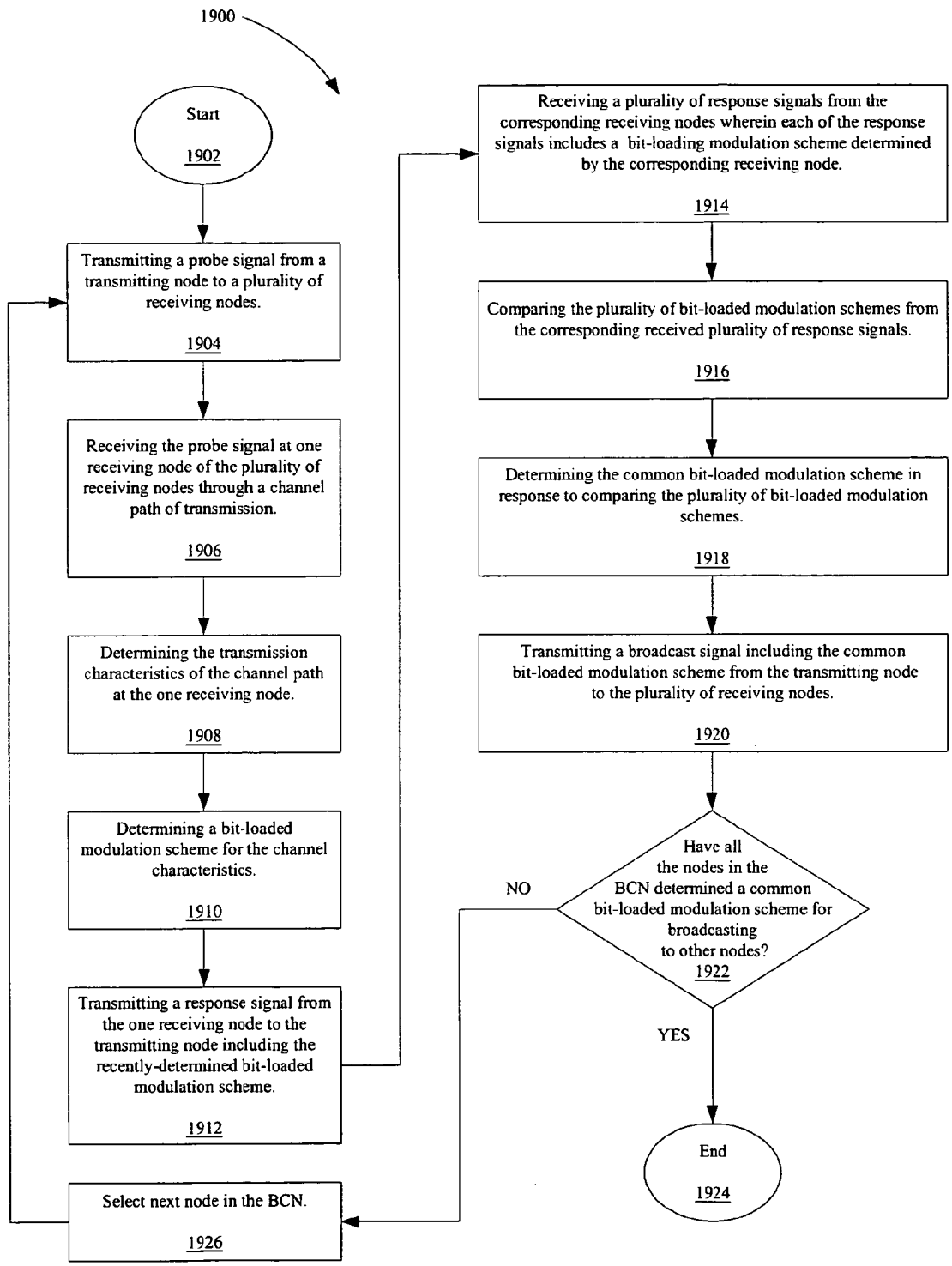
FIG. 19 shows a flowchart illustrating the method performed by the BCN network shown in FIG. 7.

FIG. 19 shows a flowchart 1900 illustrating the method performed by the BCN network shown in FIG. 7 in order to achieve the common bit-loading of FIG. 9, and also discussed in FIGS. 12, 13A, 13B, and 13C. In FIG. 19, the process starts in step 1902. In step 1904, a transmitting node transmits a probe signal to a plurality of receiving nodes In step 1906, a receiving node of the plurality of receiving nodes receives the probe signal through the appropriate channel path of transmission. The receiving node then determines the transmission characteristics of the channel path from the transmitting node to the receiving node in step 1908 and in response to the determined transmission characteristics of the channel path, the receiving node determines a bit-loaded modulation scheme for the transmission characteristics of the channel path in step 1910. The receiving node then, in step 1912, transmits a response signal to the transmitting node, informing the transmitting node of the recently determined bit-loaded modulation scheme.

The transmitting node then receives a plurality of response signals, in step 1914, from the corresponding receiving nodes wherein each of the response signals informs the transmitting node of the corresponding bit-loaded modulation scheme determined by each of the plurality of receiving nodes. In response to receiving the plurality of response signals, the transmitting node, in step 1916, compares the plurality of bit-loaded modulation schemes from the corresponding received plurality of response signals and, in step 1918, determines the common bit-loaded modulation scheme. Once the transmitting node determines the common bit-loaded modulation scheme, the transmitting node, in step 1920, transmits a broadcast signal relaying the common bit-loaded modulation scheme to the plurality of receiving nodes. This broadcast signal may either contain handshake information from the transmitting node to the plurality of receiving nodes or it may actually be a communication message containing information such as video, music, voice and/or other data.

In step 1922, if all the nodes in the BCN network have performed the handshake process that determines the common bit-loaded modulation scheme in steps 1902 through 1920, the handshake process is complete and process ends in step 1924, at which time the BCN network may begin to freely transmit information between the various nodes. If instead, there are still nodes in the BCN network that have not performed the handshake process that determines the common bit-loaded modulation scheme in steps 1902 through 1920, the process then returns to step 1926. In step 1926, the BCN network selects the next node in the BCN network and the process repeats steps 1902 through 1922 again. Once all the nodes in the BCN network have performed the handshake process, the handshake process is complete and the process ends in step 1924, at which time the BCN network may begin to freely transmit information between the various nodes.

The process in FIG. 19 may be performed by hardware or software. If the process is performed by software, the software may reside in software memory or memories (not shown) in the BCN network. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, that is "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claim is:

1. A Broadband Coaxial Network ("BCN"), comprising:
   a first BCN modem in signal communication with a coaxial cable network ("CCN"), the first BCN modem including a first controller; and
   a second BCN modem in signal communication with the CCN, the second BCM modem including a second controller;
   wherein each of the first and second controllers is configured to probe at least one respective communication link connecting that controller directly to at least one other BCN modem:
   wherein one of the first and second BCN modems is a network controller providing information allowing the admission of other BCN modems to the CCN based on an authorization; and
   wherein one of the other BCN modems transmits an admission request signal to the network controller using an admission area, wherein if a collision occurs in the admission request, the network controller resolves the collision and enables the colliding BCN modem to access the admission area at a different time, and if no collision occurs, the admission is allowed in response to the admission request signal.

2. The BCN of claim 1, wherein the second controller is configured to detect a control signal that identifies that the network controller is coupled to the CCN.

3. The BCN of claim 1, wherein the signal communication occurs between BCN modems that are located within a building.

4. The BCN of claim 3, wherein the building is a single family home.

5. The BCN of claim 3 wherein the building is a multi-unit dwelling unit.

6. The BCN of claim 1, wherein the signal communication occurs via a Time Division Multiple Access (TDMA) scheme on one or more Radio Frequency (RF) channels.

7. The BCN network of claim 1, wherein the signal communication carries encrypted data between the first BCN modem and the second BCN modem.

8. A Broadband Coaxial Network ("BCN") for communicating on an in-building coaxial cable network ("CCN"), comprising:
   a first BCN modem connected to a coaxial cable network ("CCN") and included in a plurality of BCN modems connected to the CCN, the first BCN modem including a controller having communication links to ones of the plurality of BCN modems and configured to manage data transmission between each of the BCN modems; and
   a second of the plurality of BCN modems connected to the CCN and capable of signal communication with the first BCN modem, the second of the plurality of BCN modems including a second controller having communication links to ones of the plurality of BCN modems;
   wherein each of the controllers is configured to periodically probe each of their communication links to the plurality of BCN modems;
   wherein the first controller establishes the first BCN modem as a network controller (NC) upon connection to the CCN, the network controller configured to coordinate the assignment of time slots during which data transmission between each of the plurality of BCN modems connected to the CCN occur;
   wherein the NC provides information allowing the admission of other BCN modems to the CCN based on an authorization;
   wherein one of the other BCN modems transmits an admission request signal to the network controller using an admission area, wherein if a collision occurs in the admission request, the network controller resolves the collision and enables the colliding BCN modem to access the admission area at a different time, and if no collision occurs, the admission is allowed in response to the admission request signal.

9. The BCN of claim 8, wherein the first BCN modem employs adaptive communication techniques that adapts to the characteristics of a coaxial channel between the first BCN modem and the second BCN modem.

10. The BCN of claim 8, wherein the first BCN modem is directly in signal communication with the second BCN modem across the CCN.

11. The BCN of claim 10 wherein the CCN is a type of network having an architectural configuration selected from a group consisting of a star configuration and a mesh configuration and a combinations of these configurations, in a TDMA, TDD access fashion, and the type of network utilizes at least one frequency channel.

12. The BCN of claim 9, wherein the adaptive communication techniques includes utilization of the adaptive communication techniques in both transmitting processing and receiving processing of data.

13. The BCN of claim 12, wherein the adaptive communication techniques utilize pre-coding for transmitting processing.

14. The BCN of claim 12, wherein the adaptive communication techniques utilize adaptive equalization for receiving processing.

15. The BCN of claim 12, wherein the adaptive communication techniques include pre-coding for transmitting processing based on known or learned channel response.

16. The BCN of claim 12, wherein additional signal processing techniques are used which are selected from a group consisting of OFDM bit-loading, transmit power control, transmission diversity, OFDM cyclic prefix, and probes.

17. The BCN of claim 12, further including additional MAC and communication processing including the provision of best effort and reserved communication services, processes and protocol adaptations to adapt other communication services to operate over the BCN.

18. The BCN of claim 8, wherein the NC includes a configuration selected from the group consisting of:
   a configuration that enables every BCN modem to act as a NC;
   a configuration that utilizes a frequency plan;
   a configuration that allows a new BCN modem admission to the BCN Network;
   a configuration that allows a new BCN modem to communicate with another BCN modem to characterize the channel response between them and determine a bit loading in either direction; and
   a configuration that allows each BCN modem in the network to request and be granted a transmission opportunity without a transmission conflict.

19. The BCN of claim 18, wherein the communications services provided by the BCN include BCN wide transmission priorities.

20. The BCN of claim 19, wherein the BCN services include a configuration that provides reserved bandwidth communication services.

21. The BCN of claim 8, wherein the first BCN modem provides a protocol adaptation layer for communication over the BCN, and wherein the protocol adaptation layer utilizes protocols selected from the group consisting of:
- Ethernet,
- IEEE 1394,
- Universal Serial Bus ("USB"); and
- MPEG-TS.

22. The BCN of claim 9, wherein each of the plurality of BCN modems is embedded as a part of a device selected from the group consisting of:
- a set-top box ("STB");
- a Personal Computer (PC);
- an IP STB;
- a Media Center box;
- a Media Extender box;
- a DVD player;
- a cable modem;
- a personal video recorder ("PVR");
- a TV set;
- a networking device;
- a switch/router;
- a bridge/Gateway;
- a video game console;
- a wireless access point (WAP); and
- a network attached storage.

23. The BCN of claim 9, wherein the second BCN modem is selected from the group consisting of a satellite STB, cable STB, and DSL STB.

24. The BCN of claim 22, wherein the first BCN modem utilizes the PCI bus structure.

25. The BCN of claim 24, wherein the first BCN modem utilizes another host device.

26. The BCN of claim 25, wherein the host device is either a bridging host device or a switching host device.

27. The BCN of claim 8, wherein an at least one TDMA frequency channel used by the BCN is in one or more of the following frequency bands:
- above 860 MHz;
- between 860 MHz and 950 MHz; and
- below 50 MHz.

28. The BCN of claim 8, wherein the CCN is one of the following:
- coaxial cables that have been installed for the carriage of satellite signals; and
- coaxial cables for video distribution.

29. A network device, comprising:
- a communication interface configured to connect to a broadband coaxial network ("BCN"); and
- a controller in signal communication with the communication interface, the controller configured to:
  - manage data transmission between each of a plurality of network devices connected to the BCN by assigning time slots during which data transmission between each of the network devices occur;
  - provide information allowing the admission of BCN modems to the CCN based on an authorization;
  - receive from one of the BCN modems an admission request signal for an admission area, wherein if a collision occurs in the admission request, the controller resolves the collision and enables the colliding BCN modem to access the admission area at a different time, and if no collision occurs, the controller allows admission in response to the admission request signal;
  - determine a common bit-loaded modulation scheme for a plurality of slave BCN modems by:
    - transmitting a probe signal to the plurality of slave BCN modems;
    - receiving a plurality of response signals from the plurality of slave BCN nodes; and
    - using the plurality of response signals to determine a common bit-loaded modulation scheme; and
  - broadcast the common bit-loaded modulation scheme to the plurality of slave BCN modems.

30. The BCN of claim 1, wherein the network controller:
determines a common bit-loaded modulation scheme for a plurality of slave BCN modems by:
- transmitting a probe signal to the plurality of slave BCN modems;
- receiving a plurality of response signals from the plurality of slave BCN nodes; and
- using the plurality of response signals to determine a common bit-loaded modulation scheme; and broadcasts the common bit-loaded modulation scheme to the plurality of slave BCN modems.

31. The BCN of claim 8, wherein the network controller:
determines a common bit-loaded modulation scheme for a plurality of slave BCN modems by:
- transmitting a probe signal to the plurality of slave BCN modems;
- receiving a plurality of response signals from the plurality of slave BCN nodes; and
- using the plurality of response signals to determine a common bit-loaded modulation scheme; and broadcasts the common bit-loaded modulation scheme to the plurality of slave BCN modems.

* * * * *